July 19, 1966 H. W. ENSIGN 3,261,382
TANK FILLING VALVE
Filed May 16, 1963 8 Sheets-Sheet 4

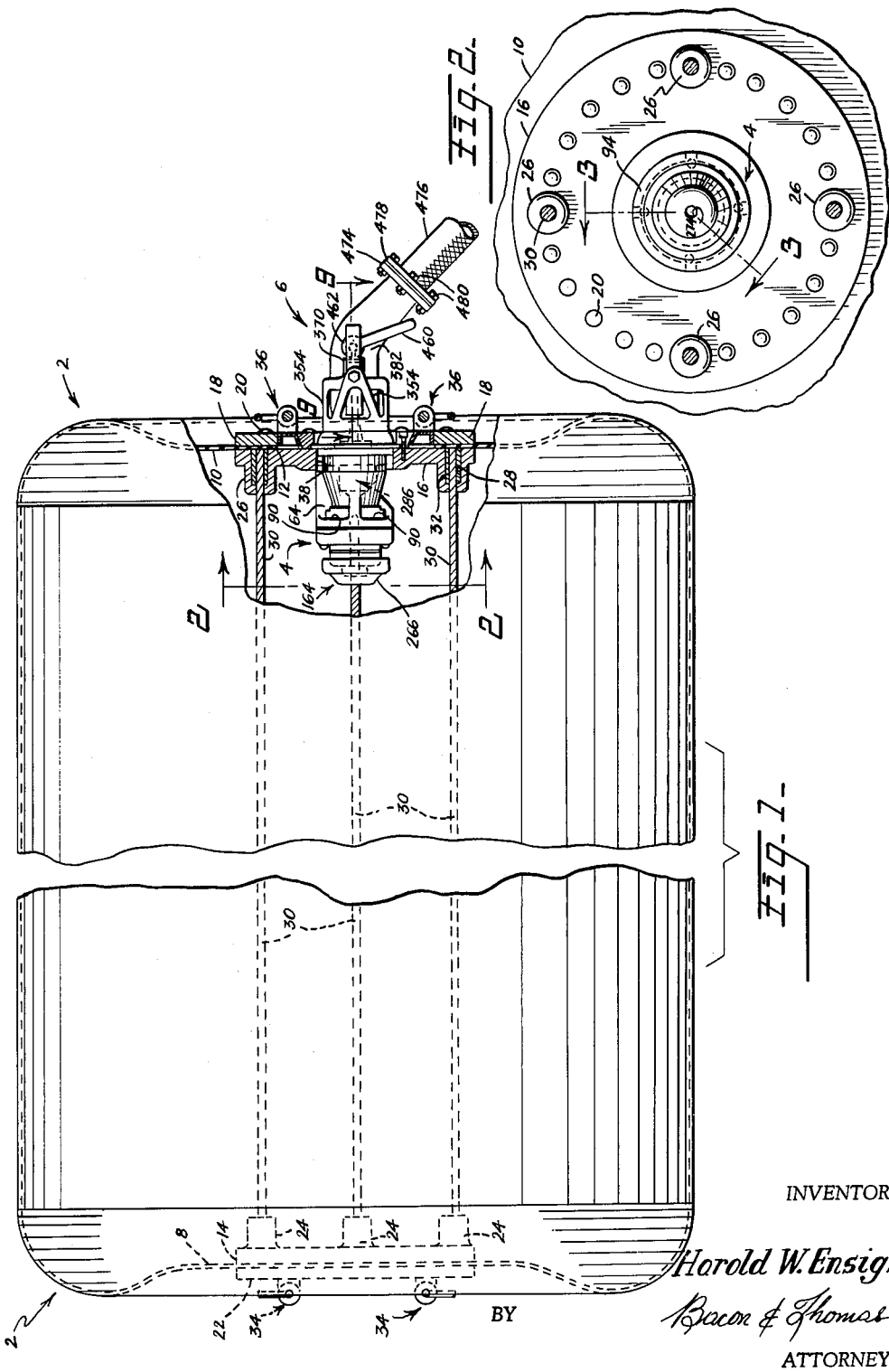

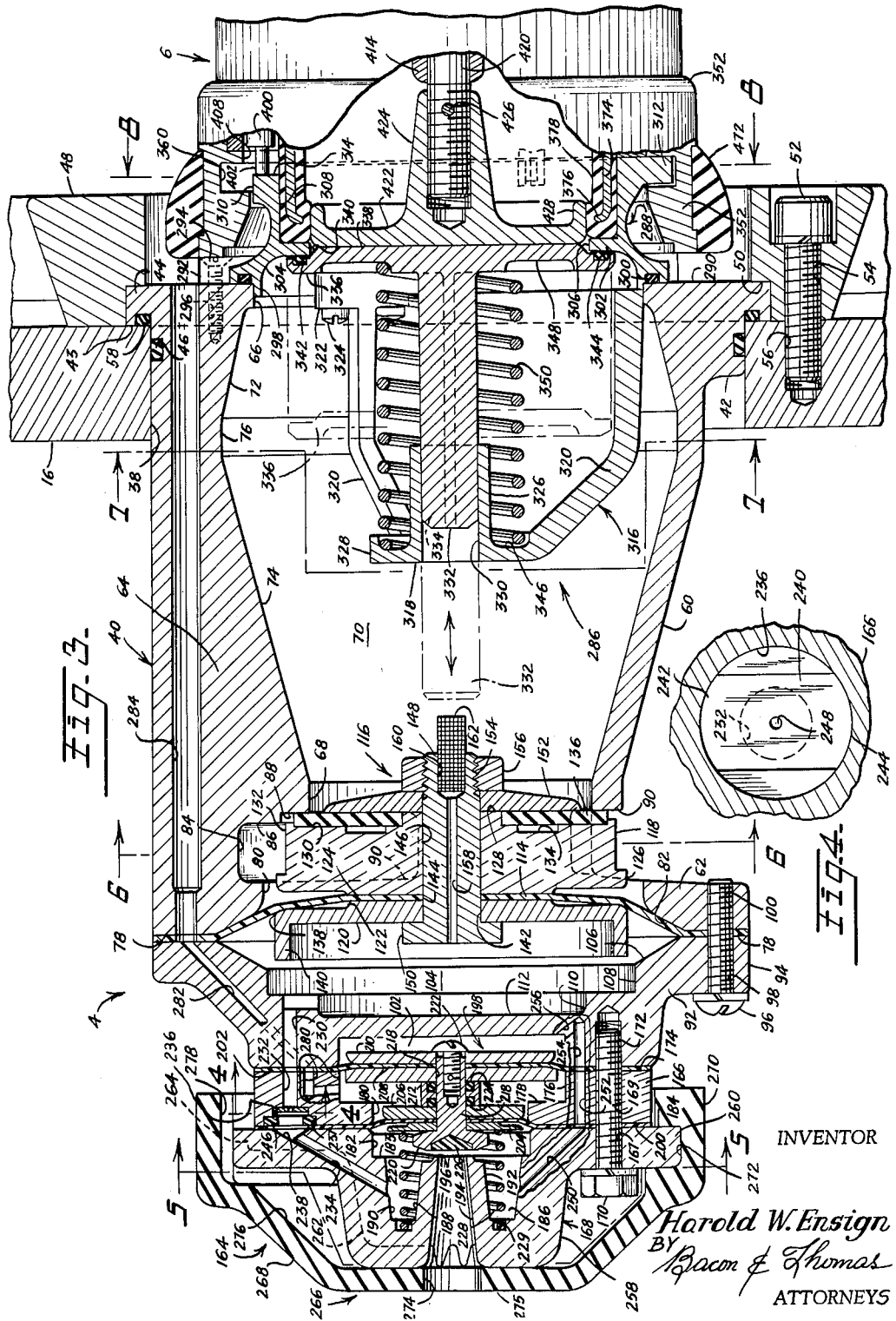

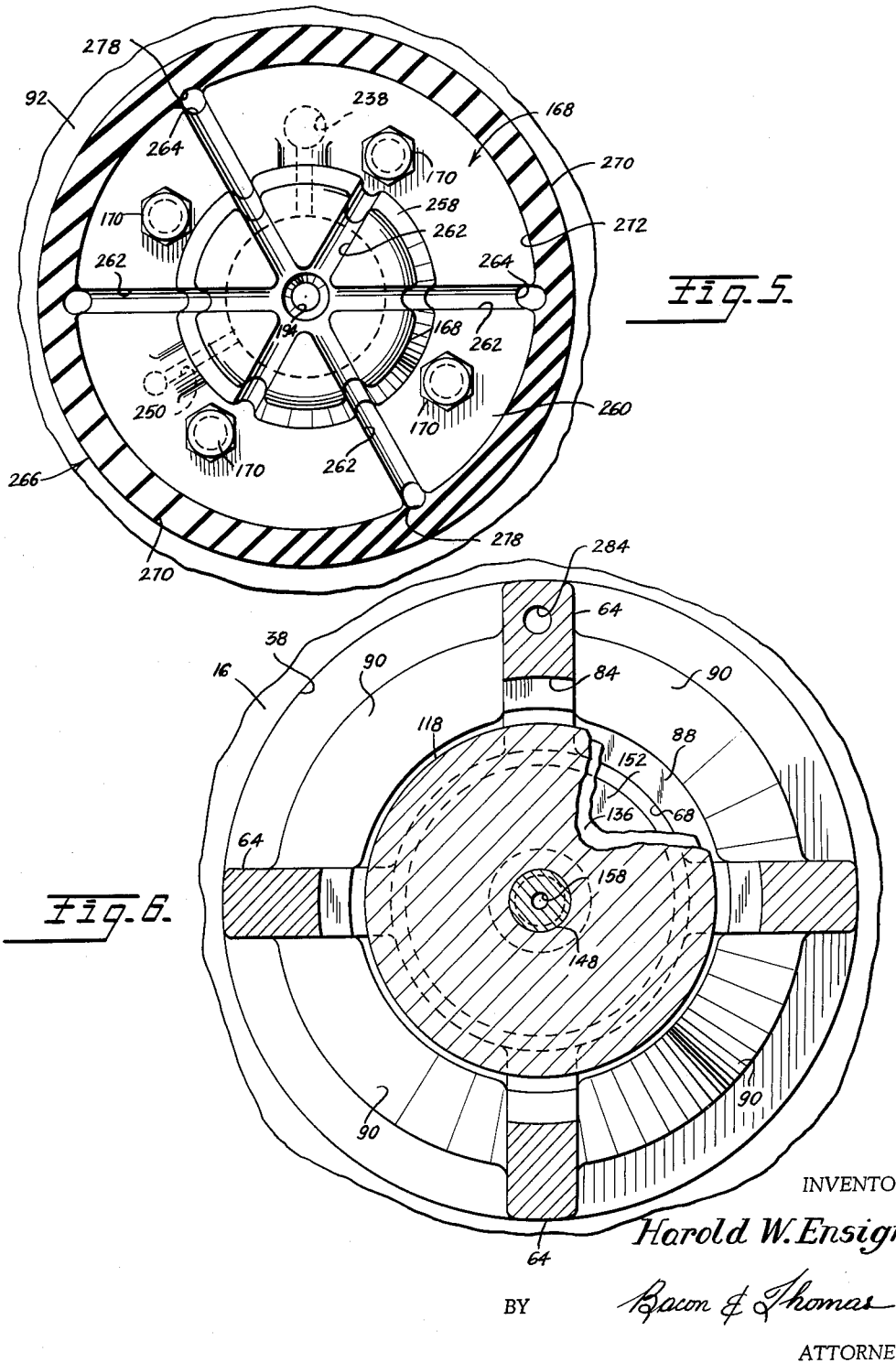

INVENTOR
Harold W. Ensign
BY Beacon & Thomas ATTORNEYS

July 19, 1966  H. W. ENSIGN  3,261,382
TANK FILLING VALVE
Filed May 16, 1963  8 Sheets-Sheet 5
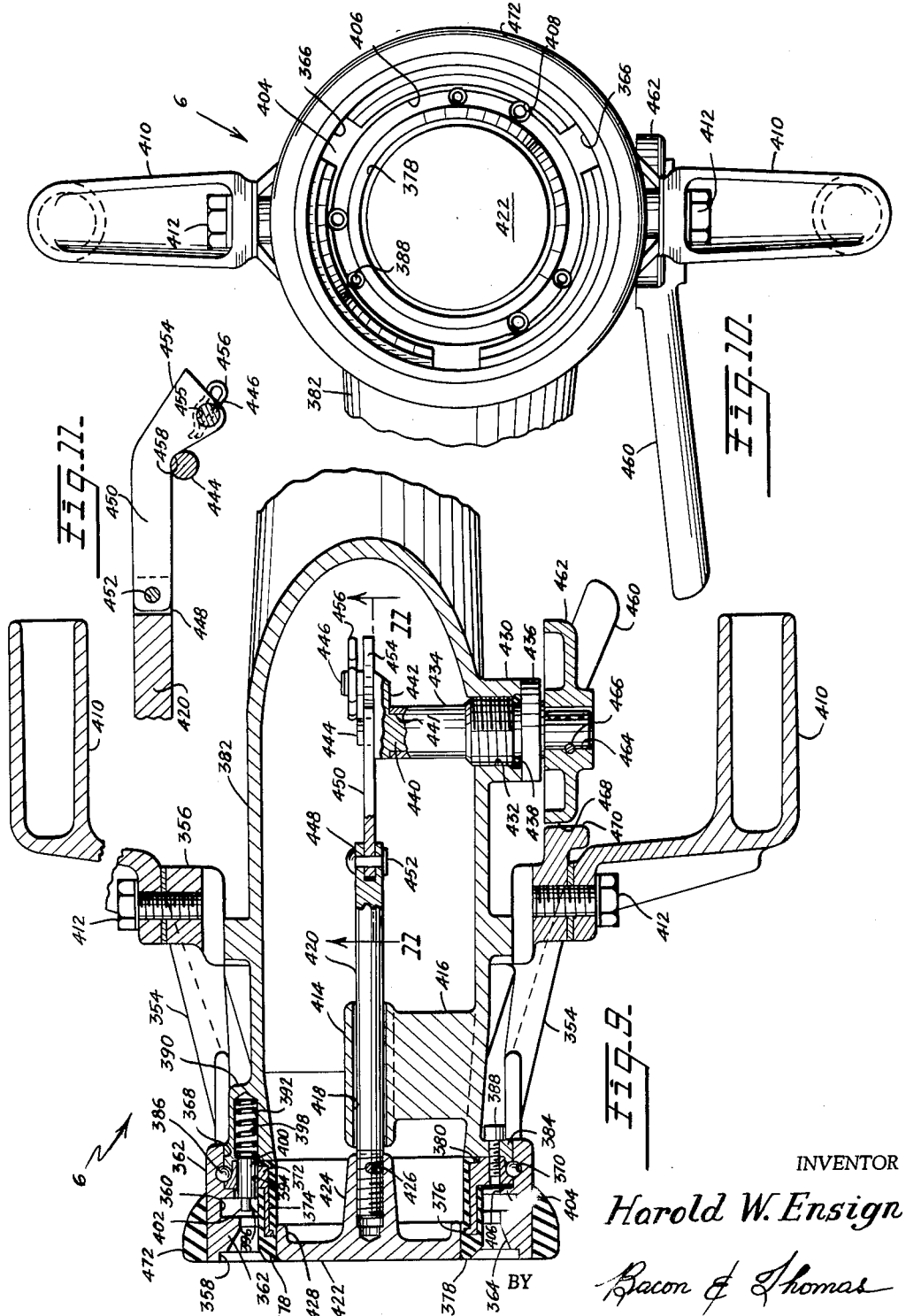
INVENTOR
Harold W. Ensign
BY Bacon & Thomas
ATTORNEYS

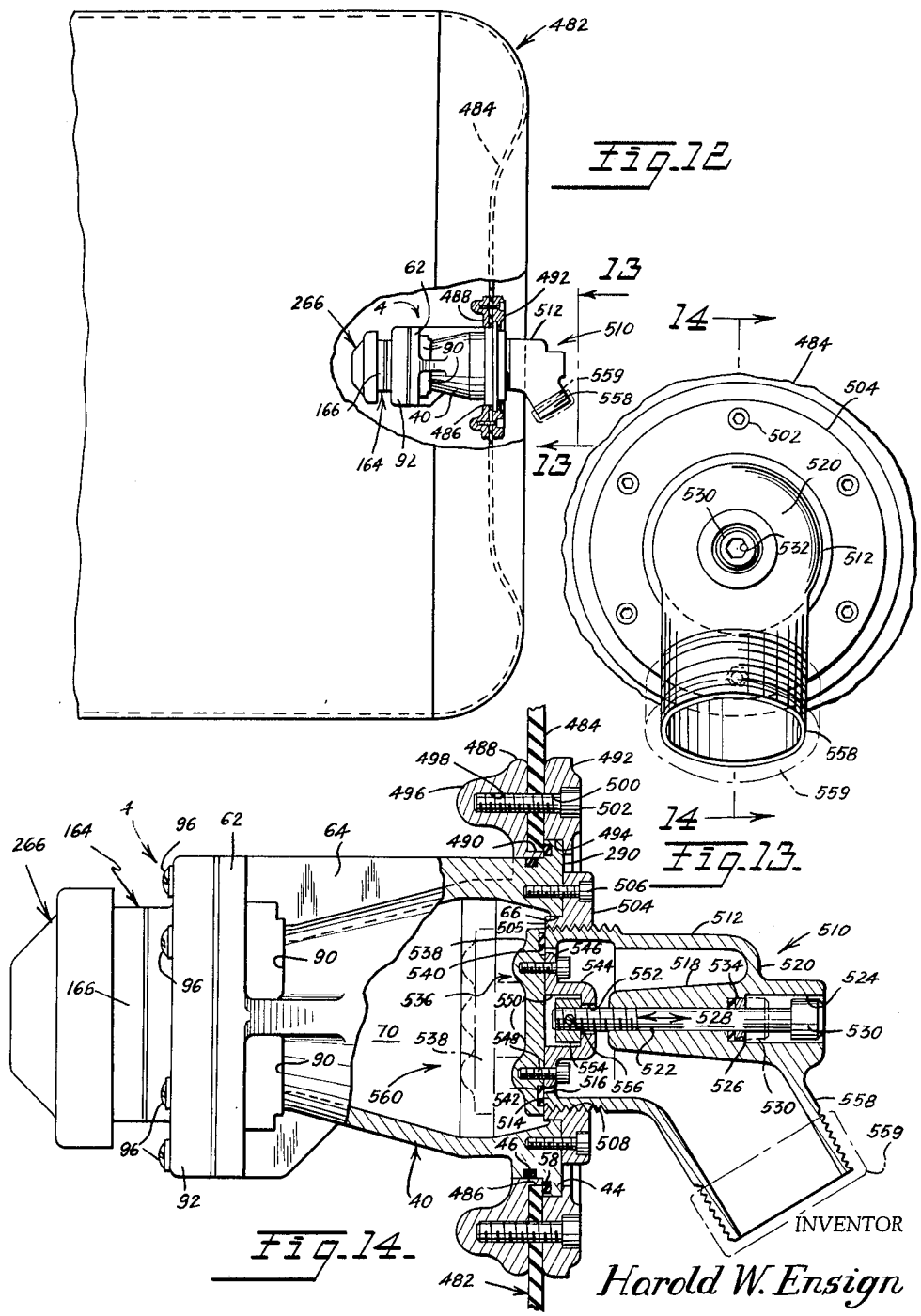

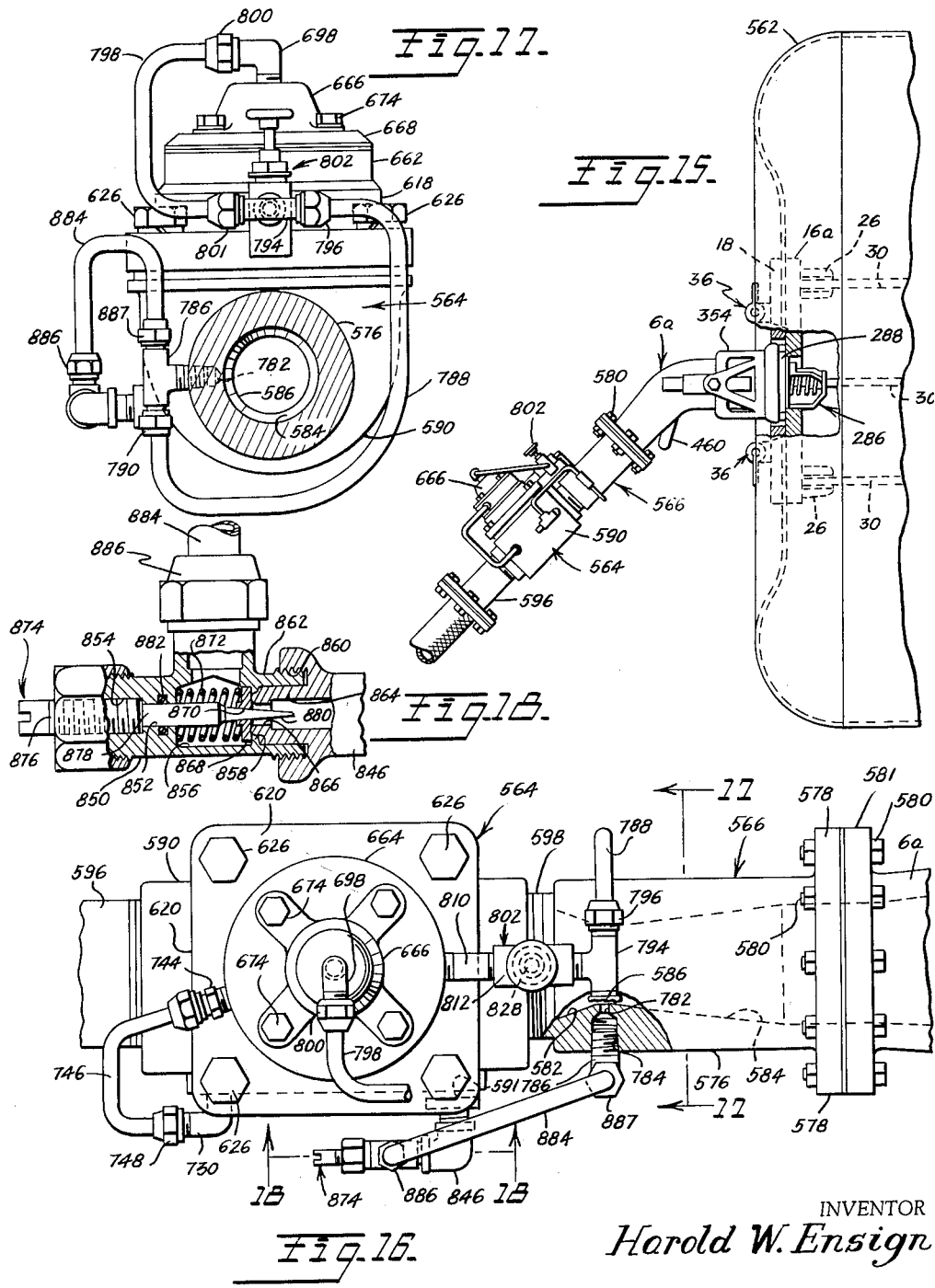

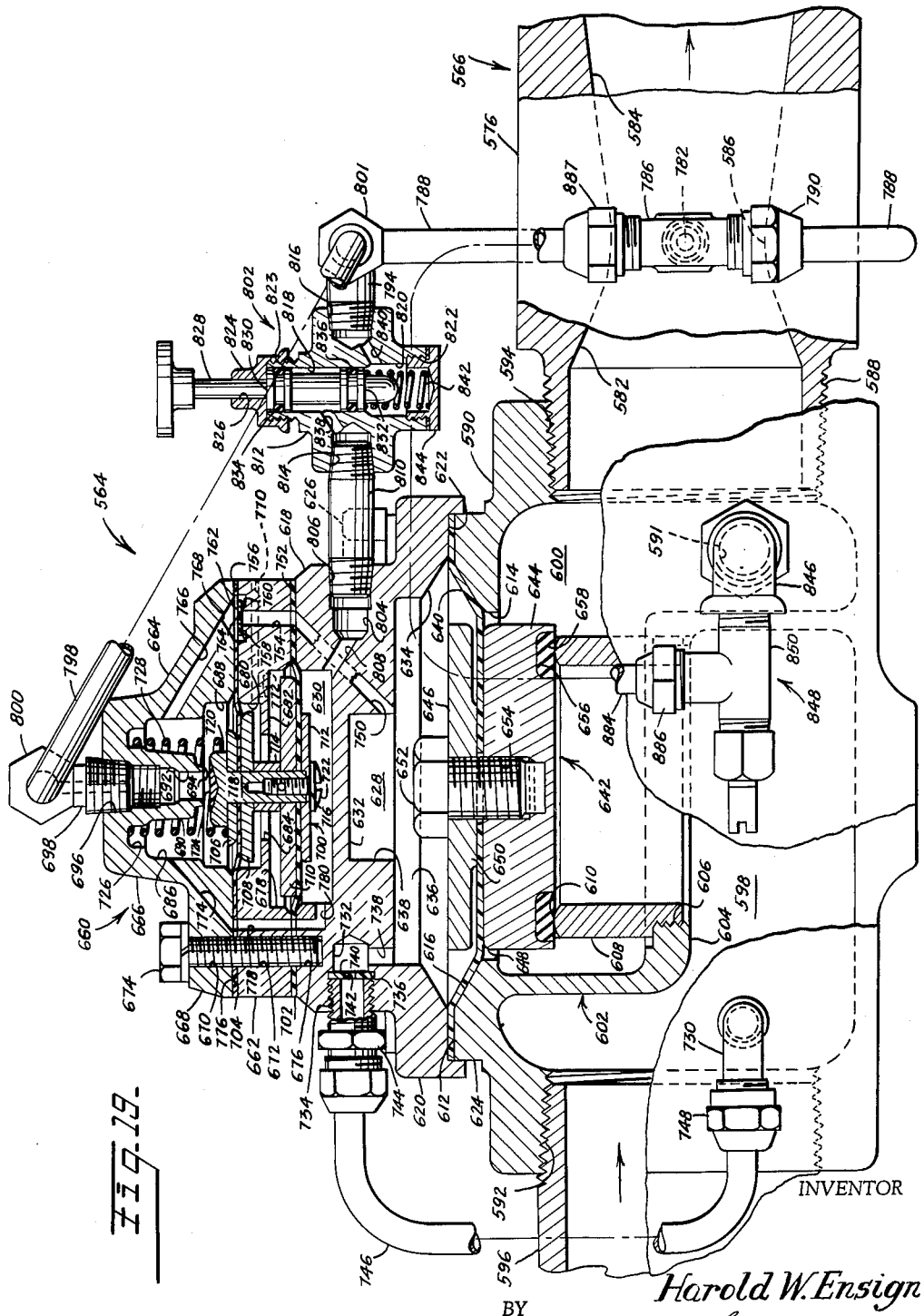

United States Patent Office 3,261,382
Patented July 19, 1966

3,261,382
TANK FILLING VALVE
Harold W. Ensign, Fullerton, Calif., assignor to
Donald G. Griswold, Newport Beach, Calif.
Filed May 16, 1963, Ser. No. 281,005
26 Claims. (Cl. 141—207)

This invention relates generally to pressure-operated valves, and more particularly to an improved tank filling valve constructed to be operated in response to pressure conditions on the outlet side thereof.

It is frequently desirable to fill fuel tanks and other containers with fluid until a preselected pressure is established within the tank or container. The filling valve of the present invention is constructed to be positioned between a fluid supply conduit and the interior of a tank which is to be filled, and is constructed to be automatically operated in response to pressure conditions within the tank to close when a predetermined pressure is attained within said tank. Specifically, the valve of the invention is designed to sense the pressure within a tank being filled to a high degree of sensitivity, and to be closed when the pressure within the tank has attained a predetermined value.

The filling valve of the invention is constructed in two principal embodiments: one for internal mounting within a tank, and the other for use on the exterior of or in a position remote from a tank. Mounting of a filling valve on the interior of a tank offers several advantages, among which are that certain passageways can be eliminated in the valve structure, and the structure of the valve is protected from damage by the enveloping container walls.

The tank filling valve of the invention includes a housing having an inlet chamber and an outlet chamber therein, a main flow control valve being positioned between said two chambers. The flow control, or main, valve incorporates a diaphragm-supported main valve core, which valve core is urged toward its closed position and toward its open position by pressure from the inlet chamber. The filling valve of the invention is also provided with a pilot valve that senses the pressure within the tank being filled (in the internally mounted embodiment), or on the outlet side of the filling valve (in the externally mounted embodiment), and controls the position of the diaphragm supporting the main valve core. Both the internal and external filling valves may be pressure-responsive, in which event the containers associated therewith are provided with an inlet poppet type check valve. The check valve associated with a container having an internally mounted filling valve will maintain a superior pressure on the inlet side of the filling valve whereby to automatically hold said filling valve closed after a predetermined container pressure has been reached. In the case of the external filling valve, the check valve serves as a closure valve for the container.

The pilot valve includes a control chamber having an outlet port which is placed in communication with the outlet chamber of the filling valve. The valve core is supported by a differential diaphragm within the pilot valve control chamber, which valve core is spring-biased toward an open position. The diaphragm is constructed so that when pressure within the outlet chamber (externally mounted valve), reaches a predetermined value, the pilot valve will be closed against the force of said spring.

The side of the main valve diaphragm which is in communication with the inlet chamber also communicates with the control chamber of the pilot valve. Thus, so long as the pilot valve remains open, no pressure build-up can occur on the main diaphragm sufficient to cause the main valve to close. However, when the pilot valve has been closed, a pressure build-up will occur on the main diaphragm, which will be sufficient to close the main valve.

The main valve will remain closed for as long as the pressure within the inlet chamber is greater than the pressure within the outlet chamber. When it is desired to open the main valve, and have reverse flow out of the tank, the pressure within the inlet chamber is lowered to a value less than that within the outlet chamber. The main diaphragm will then be urged by the pressure within the outlet chamber in a direction to open the main valve, and outflow will occur.

In one principal embodiment of the present invention, the tank filling valve is positioned within the tank to be filled. In this embodiment, communication is established between the outlet chamber of the filling valve and the outlet port of the pilot valve control chamber solely by the walls defining the interior of the container. In many instances, the valve of this embodiment will be utilized with a collapsible container constructed of flexible material.

When a container having flexible walls is utilized with an internally mounted filling valve, it is possible that the collapsing walls of the emptying container might tend to close the outlet port of the pilot valve control chamber. To guard against such a happening, the present invention is provided with protective cap means constructed to insure that the collapsing walls of the container cannot seal said outlet port.

In a second principal embodiment of the present invention, the tank filling valve is intended to be mounted exteriorly of a tank to be filled, and in fact one valve may be utilized to fill several different tanks. In the latter instance, the filling valve will normally be permanently connected to a fluid supply line, and the several different tanks will be connected one at a time thereto. When the filling valve is permanently connected to a fluid supply line, means must be provided to open the main valve even in the presence of the resulting continuously high inlet pressure. The valve of the second principal embodiment of the present invention is provided with a blowdown valve arrangement which facilitates opening thereof in the presence of high inlet pressure.

It is an object of the present invention to provide a valve which will automatically open and close in response to preselected pressure conditions on the outlet side thereof.

It is also an object of the invention to provide a valve especially adaptable for use in filling closed containers, and which is constructed to be automatically operated in response to preselected pressure conditions within said containers.

A further object is to provide a filling valve for mounting within a container, and constructed to be automatically operated in response to pressure conditions therewithin.

Another object is to provide an outlet-pressure operated filling valve, constructed to respond with a relatively high degree of sensitivity to pressure changes on the outlet side thereof.

Still another object is to provide an internally mounted filling valve for use with collapsible containers, and constructed to remain operative when the walls of said container are collapsed thereabout.

A further object is to provide a filling valve constructed to be automatically closed in response to a preselected pressure within a container, and which may be readily opened when desired to empty said container.

It is also an object to provide a filling valve which may be positioned remotely from a container, and which is automatically operated in response to pressure conditions within the container.

Another object is to provide a filling valve which may be easily attached to and removed from a container.

Other objects and many of the attendant advantages of this invention will be readily appreciated as the same becomes better understood by referring to the following detailed description, when considered in connection with the accompanying drawings, wherein:

FIG. 1 is a fragmentary, side elevational view of a collapsible tank having a filling valve internally mounted within one end thereof, said tank being partially broken away to indicate the construction thereof, and to show the manner in which the internal tank filling valve of the invention is mounted therein;

FIG. 2 is a fragmentary, vertical sectional view taken along the line 2—2 of FIG. 1, and further shows the construction of the collapsible container;

FIG. 3 is an enlarged detail sectional view, taken generally along the line 3—3 of FIG. 2, showing the construction of the internally mounted filling valve of the invention;

FIG. 4 is an enlarged, fragmentary, vertical sectional view, taken along the line 4—4 of FIG. 3, showing the construction of the one-way check valve;

FIG. 5 is a vertical sectional view taken generally along the line 5—5 in FIG. 3, and shows the external configuration of the cover of the pilot valve;

FIG. 6 is a vertical sectional view, partially broken away, taken along the line 6—6 of FIG. 3, and shows the construction of the main valve which separates the inlet chamber of the filling valve from the outlet chamber thereof;

FIG. 9 is an enlarged horizontal, sectional view, taken generally along the line 9—9 of FIG. 1, of the filling nozzle utilized with the embodiment of the filling valve of FIG. 1, showing the construction thereof;

FIG. 10 is an end elevational view of the filling nozzle of FIG. 9, as viewed from the outlet end thereof;

FIG. 11 is a detail sectional view, taken along the line 11—11 of FIG. 9, showing the construction of the over-center operating mechanism for the valve of the filling nozzle;

FIG. 12 is a fragmentary, elevational view, partially broken away, of a modified collapsible container having a filling valve and a modified filling nozzle mounted therein;

FIG. 13 is a fragmentary, end elevational view, on an enlarged scale, of the filling nozzle, of FIG. 12, taken generally along the line 13—13 of said FIG. 12;

FIG. 14 is a vertical, sectional view through the modified filling nozzle, and partially through the filling valve, taken generally along the line 14—14 of FIG. 13;

FIG. 15 is a fragmentary plan view of a modified container wherein the internally mounted filling valve has been omitted, the inlet check valve retained, and an external filling valve has been connected with the filling nozzle;

FIG. 16 is an enlarged fragmentary view similar to FIG. 15, showing a partially broken-away Venturi nozzle section utilized to connect the filling valve to the filling nozzle and to partially compensate for the pressure drop between the main valve and the container;

FIG. 17 is a transverse, vertical sectional view taken along the line 17—17 in FIG. 16, and shows the filling valve of FIG. 15 in end elevation;

FIG. 18 is an enlarged, detailed vertical sectional view, taken along the line 18—18 of FIG. 16, showing the construction of the needle valve attached to the filling valve of FIG. 15; and FIG. 19 is an enlarged, fragmentary, irregular vertical sectional view, taken generally along the longitudinal axis of the filling valve of FIG. 15, showing the construction thereof.

Figure 7:
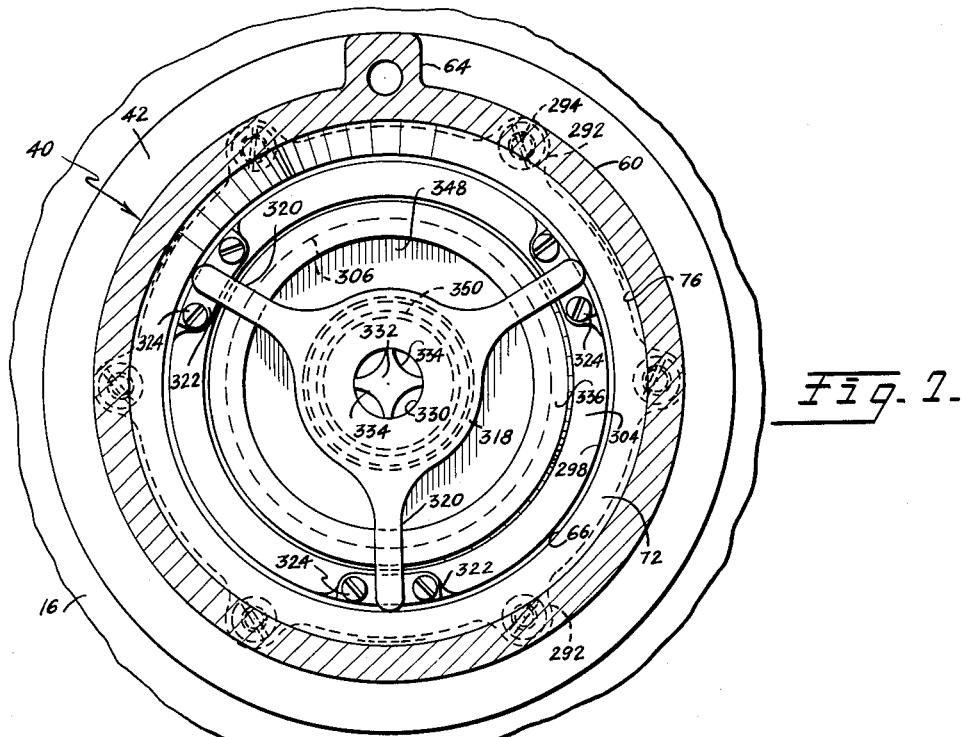
FIG. 7 is a vertical sectional view taken generally along the line 7—7 of FIG. 3, and shows the construction of the inlet chamber check valve.

Referring now to the drawings, a collapsible container, or tank, is indicated at 2, said tank having a filling valve 4 mounted therein; the valve 4 has a filling nozzle 6 detachably connected thereto. The collapsible container 2 may be constructed of molded rubber, or another suitable material, and includes a pair of generally radial end walls 8 and 10. The end wall 10 has a circular opening 12 centrally thereof, and a pair of confronting circular plates 14 and 16 are positioned centrally on the end walls 8 and 10, respectively. An annular ring 18 is positioned on the outside of the end wall 10, and is secured to the plate 16 by a plurality of bolts 20, whereby the portion of said end wall 10 surrounding the opening 12 is securely clamped between plate 16 and ring 18; a similar annular ring 22 is secured to the plate 14, whereby the end wall 8 is securely clamped between the members 22 and 14.

The confronting plates 14 and 16 have four circumferentially spaced bosses 24 and 26, respectively, thereon, said bosses each having an inwardly tapering bore 28 therein positioned to open outwardly toward the opposite end wall 8 or 10, respectively. The opposite ends of a flexible cable 30 are received within the tapered bores 28 in each pair of confronting bosses 24 and 26 on the plates 14 and 16, and are secured in position by tapered wedge sleeves 32 which surround the ends of said cable within said tapered bores. Thus, the cables 30 function to tie the two radial walls 8 and 10 together, and insure that the container will retain its desired shape when filled with liquid. The annular rings 18 and 22 each have a pair of diametrically opposed clevises 34 and 36, respectively, secured to the inner diameters thereof, said clevises facilitating handling of the container. It should be noted that the cables 30 also function to facilitate handling of the container when it is lifted utilizing the clevises 34 or 36 at only one end thereof.

The plate 16 has a circular opening 38 centrally thereof, within which the internally mounted tank filling valve 4 of the invention is received. Referring to FIG. 3, the valve 4 includes a main body 40, said main body having a short cylindrical portion 42 at its outer end terminating in a rectangular in cross-section flange 44. The diameter of the cylindrical portion 42 corresponds to the diameter of the circular opening 38, and said portion has an O-ring 46 received in a groove therein which engages the cylindrical wall defining said opening 38.

An annular mounting flange 48 is positioned on the exterior of the plate 16, and has an annular groove 50 on its inner peripheral edge of a diameter to receive the flange 44. The annular flange 48 is secured to the plate 16 by a plurality of circumferentially spaced bolts 52, which pass through bores 54 in said flange and are secured within threaded bores 56 in the plate 16. The radial face 43 of the flange 44 that engages the plate 16 has an annular groove therein, within which may be disposed an O-ring seal 58 as an alternate to O-ring seal 46.

The body 40 further includes a reduced diameter, generally frusto-conical portion 60, which terminates at the inner end of said body in an annular flange 62. Four circumferentially spaced, radially directed, axially extending ribs 64 extend between the frusto-conical portion 60 and the flange 62 (best seen in FIGS. 1, 3, 6 and 14). The body 40 is provided with a cylindrical inlet opening 66 at its outer end, and with a relatively smaller cylindrical outlet opening 68 at its inner end. An inlet chamber 70 is defined between the inlet and the outlet openings 66 and 68, and includes a short, frusto-conical portion 72 and a longer, oppositely tapering frusto-conical portion 74, said frusto-conical portions 72 and 74 being connected by a short cylindrical portion 76.

The annular flange 62 includes a radial end face 78 having a cylindrical opening 80 centrally thereof, which opening has a diameter substantially larger than that of the outlet opening 68. A frusto-conical wall 82 extends between the radial end face 78 and the cylindrical opening 80, said wall 82 being rounded adjacent said opening 80 to provide a smooth surface. An annular outlet chamber 84 is positioned between the cylindrical opening 80 and the outlet opening 68, and includes a radial wall 86 having an annular valve seat 88 formed therein about the outlet opening 68. The body 40 has four circumferentially extending openings 90 therein, positioned to extend between the ribs 64; the openings 90 communicate the outlet chamber 84 with the exterior of the main body 40, and are best seen in FIGS. 1 and 6.

Secured to the main body 40 is an intermediate body 92, which includes thereon an annular flange 94 positioned to confront the flange 62. The flanges 94 and 62 are secured together by a plurality of circumferentially-spaced bolts 96, which bolts 96 pass through bores 98 in the flange 94 and are secured within threaded bores 100 in the flange 62. The intermediate body 92 includes a pair of centrally positioned, oppositely facing chambers 102 and 104. The chamber 104 includes a frusto-conical portion 106 positioned to confront the frusto-conical wall 82 in the body 40, and an intermediate cylindrical portion 108. The chamber 104 terminates in a relatively small, cylindrical portion 110, which is separated from the cylindrical chamber 102 by a radial wall 112.

A flexible, main diaphragm 114 is positioned between the flanges 94 and 62, and is secured in position by the bolts 96, which bolts 96 pass therethrough. The diaphragm is pressure operated, and functions to support a main valve core 116.

The main valve core 116 includes a main disk 118, which is received within the cylindrical opening 80 and which confronts the valve seat 88. Positioned on the opposite side of the diaphragm 114 from the main disk 118 is a disk 120, both of said disks 118 and 120 having raised bosses 122 and 124, respectively, on their confronting faces; if desired, the surfaces of the bosses 122 and 124 which engage the main diaphragm 114 can be serrated in the known manner to insure proper gripping of said diaphragm.

The main disk 118 has a flange 126 thereon positioned to confront the main diaphragm 114, the outer peripheral edge of said flange 126 being rounded to prevent damage to the diaphragm. The end face 128 of the main disk 118 has an annular recess 130 therein, the outer peripheral wall 132 defining said recess being cut back slightly to lie behind the end face 128. An annular groove 134 is positioned in the bottom wall of the recess 130, the center of said annular groove 134 being positioned at a distance from the inner edge of said recess 130 about one-fourth the radial extent of said recess. A resilient ring 136 is received within the recess 130, said ring 136 having an outer diameter greater than that of the outlet opening 68 and being positioned to engage the valve seat 88.

The diaphragm disk 120 has a rounded, peripheral edge 138 thereon positioned to confront the main diaphragm 114, and includes a rearwardly-projecting cylindrical flange 140 on its outer periphery. The disk 120 has a bore 142 centrally therethrough, which bore is positioned to confront bores 144 and 146 of like diameters in the main diaphragm 114 and the main disk 118, respectively. A stem 148 extends through said aligned bores 142, 144 and 146, and includes a flange 150 on the end thereof which extends through the disk 120. The end of the stem 148 opposite the flange 150 extends through a retaining washer 152, and has threads 154 thereon for reception of a retaining nut 156. The retaining washer 152 has a diameter substantially less than that of the outlet opening 68, and functions to properly seat the resilient ring 136 within the recess 130.

The stem 148 has a longitudinally extending passage 158 therethrough, and the threaded end 154 of said stem 148 has a counterbore 160 therein within which is fitted a filter unit 162. The passage 158 functions to conduct fluid from the inlet chamber 70 to the main diaphragm chamber 104, and the filter unit 162 insures that no foreign matter will enter and block the passageway 158 and other passageways which are in communication with the chamber 102. The operations of the valve core 116 and the main diaphragm 114 are controlled by a pilot valve assembly 164, which is mounted on the intermediate body 92.

The pilot valve assembly 164 includes a pilot body 166 and a cover 168, said pilot body 166 and said cover 168 being secured to the intermediate member 92 by a plurality of circumferentially spaced bolts 170 which extend through aligned bores 167 and 169, respectively, in the cover 168 and the pilot body 166, and are secured within threaded bores 172 in the end face 174 of the intermediate body 92. The pilot body 166 has a cylindrical chamber 176 therein positioned to confront and having the same diameter as the chamber 102. The bottom wall 178 of the cylindrical chamber 176 has a cylindrical opening 180 therethrough, the edge of said opening 180 which faces the cover 168 being rounded.

The cover member 168 has a cylindrical chamber 182 in the end face 184 thereof, which chamber is positioned to confront and has the same diameter as the cylindrical opening 180; the end of the chamber 182 which confronts the opening 180 is chamfered. The bottom wall 183 of the chamber 182 has an annular chamber 186 formed therein, said annular chamber 186 being defined by inner and outer tapered walls 188 and 190, respectively. The inner tapered wall 188 of the annular chamber 186 defines a frusto-conical collar 192, which has a complementary tapered out port 194 extending therethrough to the exterior of the cover 168. An annular, rounded lip 196 is positioned on the end face of the tapered collar 192 about the inner end of the outlet port 194, said lip 196 defining a pilot valve seat.

Disposed within the pilot valve assembly 164 is a valve core assembly 198, said assembly 198 including a first diaphragm 200 secured between the cover member 168 and the pilot body 166, and extending across the opening 180. A second diaphragm 202 is secured between the pilot body 166 and the intermediate body 92, and extends across the confronting chambers 102 and 176. A pair of diaphragm disks 204 and 206 are disposed on opposite sides of the first diaphragm 200, and a second pair of diaphragm disks 208 and 210 are disposed on opposite sides of the diaphragm 202; the disks 206 and 208 are thus positioned within the chamber defined between the two diaphragms.

An H-shaped in cross-section annular spacer 212 is positioned between the disks 206 and 208, and the disks 204, 206, 208, 210 and the spacer 212 have aligned bores of like diameters extending therethrough. A cylindrical stem 218 passes through the aligned bores in the disks 204, 206, 208, 210 and the spacer 212.

The stem 218 has a hexagonal head 220 on the end thereof which confronts the tapered collar 192, and the opposite end of said stem has a threaded bore therein for reception of a screw 222; the screw 222 passes through the bore 214 in the disk 210, and functions to secure the four disks 204, 206, 208 and 210, and the spacer 212, in assembled relationship. The hexagonal head 220 on the valve stem 218 facilitates assembly of the valve core 198. The spacer 212 has a pair of O-rings 224 positioned in annular recesses in the opposite end faces thereof in engagement with the disks 206 and 208, which O-ring seals 224 function to insure that there will be no leakage along the valve stem 218.

The hexagonal head 220 has a recess therein within which is disposed a resilient core 226, said core 226 having a diameter greater than that of the valve seat 196. One end of a coil spring 228 is received within an annular groove 29 in the bottom wall of the annular chamber 186, and the other end of said spring 228 engages the surface of the disk 204 about the hexagonal stem head 220. Thus, the coil spring 228 functions to urge the differential diaphragm assembly 198 and the hexagonal head 220 away from the valve seat 196.

The main diaphragm chamber 104 is placed in communication with the annular chamber 186 by a passage 230 in the intermediate body 92, an aligned passage 232 in the pilot body 166, and an angled, communicating passage 234 in the cover 168. The end of the passage 232 which confronts the cover member 168 has a first, relatively small counterbore 236 and a larger, concentric counterbore 237 formed therein, and the end of the angled passage 234 which confronts said counterbores 236 and 237 is enlarged to define a conical opening 238.

As is best shown in FIGS. 3 and 4, a check valve plate 240 is received within the first counterbore 236, the opposite ends 242 and 244 of said plate 240 being rounded to correspond to the curvature of and extending nearly into engagement with the circular wall of the counterbore 236. The width of the plate 240 is substantially about midway between the diameters of the passage 232 and the counterbore 236.

A retaining ring 246 is received within the counterbore 237, and has a bore therethrough having a diameter greater than the width of said plate 240. The larger end of the conical opening 238 has a diameter corresponding generally to that of the larger counterbore 237. Thus, when fluid flows from right to left in FIG. 3, through the passage 232, the plate 240 will not block the flow of such fluid. However, fluid flowing from left to right from the angled passage 234 toward the passage 232 will cause the plate 240 to engage the bottom wall of the smaller counterbore 236, thus sealing off the passage 232 except for a very small vent bore 248 provided centrally of the plate 240.

The passages 230, 232 and 234 have like diameters, which are substantially larger than that of the passage 158 through the valve stem 148. Thus, any fluid flowing from the inlet chamber 70 into the main diaphragm chamber 104 may flow freely from said main diaphragm chamber 70 into the annular chamber 186 in the cover 168, and then out through the outlet port 194, for so long as the resilient core 226 is not seated upon the valve seat 196. By having the passages 230, 232 and 234 of a larger diameter than the passage 158, no pressure build-up can occur within the main diaphragm chamber 104 until the pilot valve 164 is closed.

The cover 168 has an angled passage 250 therein, which communicates at one end with the annular chamber 186 and at its other end with aligned passages 252 and 254 in the pilot body 166 and the intermediate member 92, respectively. The passage 254 is in communication with the larger differential diaphragm chamber 102 through a passage 256, and thus both the small diaphragm chamber 182 and the large diaphragm chamber 102 are in communication with the annular chamber 186 and, because of the passages 230, 232 and 234, with the main diaphragm chamber 104.

The diaphragms 200 and 202 which support the pilot valve core assembly 198 together define a differential diaphragm, with the effective cross-sectional area exposed within the diaphragm chamber 102 being preferably about twice the effective area exposed within the diaphragm chamber 182. Because of this differential relationship, pressure building up within the annular chamber 186 will act on the differential diaphragm to urge the hexagonal stem head 220 into engagement with the valve seat 196 against the force of the spring 228. However, until the pressure build-up within the chamber 186 becomes sufficiently great to close the pilot valve outlet port 194, fluid will flow from the main diaphragm chamber 104 into said annular chamber 186 and outwardly from the filling valve 4 through said outlet port 194.

The filling valve of FIGS. 1 and 3 is mounted within the collapsible container 2, so that fluid flowing outwardly through the outlet port 194 will enter directly into said container. It is essential that the port 194 remain unobstructed at its outer end, if the valve 4 of the invention is to properly function. However, it has been found that when the filling valve 4 is utilized with a partially or fully collapsed container 2 constructed from flexible material, the walls of said container will occasionally envelop the valve 4 and seal off the open end of the port 194. To prevent this from happening, the invention is provided with structure to insure that the port 194 will be open at all times.

Referring to FIGS. 3 and 5, the cover 168 is seen to include a frusto-conical dome 258 and a flange 260; the bolts 170 pass through said flange 260. A plurality of circumferentially spaced, radially extending grooves 262 are provided on the external surface of the cover 168, and extend from the port 194, down the frusto-conical dome 258, and across the flange 260 to the peripheral edge thereof, where they communicate with axially directed grooves 264 in said flange 260. A resilient cap 266 is received over the cover 168, and includes a frusto-conical body 268 which merges at its radially outer edge into a cylindrical body portion 270. The inner wall of the cylindrical body portion 270 has an annular groove 272 therein of a size to receive the flange 260, and the resilient cap 266 may be readily distorted to cause said flange 260 to be received within said groove 272. The cap 266 has a central port 274 in its end wall 275, positioned to confront the outlet port 194 and thus providing one exhaust opening for said outlet port 194.

The inner wall 276 of the frusto-conical portion 268 is spaced from the cover 168, and passages are defined between the inner wall 276 of said cap 266 by said space and by the radially directed grooves 262 in the cover 168. The inner cylindrical wall of the cylindrical portion 270 has a plurality of circumferentially spaced, axially directed grooves 278 therein, which preferably are positioned to confront the axially directed grooves 264 in the flange 260. Thus, a plurality of exhaust passages are provided for the outlet port 194 through the grooves 262, 264 and 278, said plurality of passages opening in a direction disposed oppositely to the direction in which the port 274 opens. The cap 266 and the cooperating grooves 262 and 264 on the cover member 168 just described thus insure that outlet port 194 will not be closed, even if the walls of the collapsible container 2 should come into engagement with the filling valve 4.

The filling valve 4 of the invention is utilized to fill the container 2 with fluid in the following manner. A fluid supply line is connected to the inlet chamber 70, and conducts fluid under pressure thereinto. When the tank 2 is empty, fluid pressure within the chamber 70 will act on the main valve core 116 to move it away from the valve seat 88, thus permitting fluid to flow through the outlet opening 68 into the outlet chamber 84, and thence into the container 2 through the openings 90. A portion of the fluid contained within the inlet chamber 70 will flow through the passage 158 in the stem 148 into the main diaphragm chamber 104. During the early first portion of the filling operation, the fluid contained within the chamber 104 will flow outwardly therefrom through the passages 230, 232 and 234, and past the plate 240, into the annular chamber 186, and thence outwardly into the container 2 through the open outlet port 194. As has been described hereinabove, the sizing of the various passages insures that no pressure build-up will occur during this period within the diaphragm chamber 104.

The pilot valve assembly 164 of the invention is designed to close when the pressure within the container 2 attains a preselected value, and to then cause the main valve core 116 to close. As filling of the container 2 through the filling valve 4 continues, the pressure within the container 2 will begin to build up and approach this preselected value. When the preselected pressure valve within the container has nearly been attained, this pressure will be admitted to chamber 186, from where it will flow through the passages 250, 252, 254 and 256 to the larger side of the differential diaphragm valve core assembly 198.

When the container pressure reaches the preselected design value, the pressure acting on the differential diaphragms 200 and 202 will be sufficient to overcome the force exerted by the coil spring 228, and the resilient core 226 in the hexagonal head 220 on the valve stem 218 will engage the seat 196 and seal the outlet port 194. The coil spring 228 is selected to have a force constant which will insure that the pilot valve assembly 164 will close at the desired, preselected container pressure. After the pilot valve 164 has closed, there no longer is an exhaust path for fluid flowing through the passage 158 into the main diaphragm chamber 104. Thus, a pressure build-up will begin within the main diaphragm chamber 104, caused by fluid flowing thereinto from the inlet chamber 70.

After the outlet port 194 is closed, a pressure build-up will rapidly occur within the main diaphragm chamber 104, until the pressure therein equals that in the inlet chamber 70; the pressure build-up within the chamber 104 will cause the valve core assembly 116 to move into engagement with the valve seat 88, thus blocking flow between the inlet and outlet chambers 70 and 84. It should be noted that the area of the main diaphragm 114 that is exposed within the chamber 104 is substantially greater than the diameter of the outlet opening 68. This substantial difference in area will insure, given equal pressure within the inlet chamber 70 and the main diaphragm chamber 104, that the valve core 116 will remain firmly seated on the valve seat 88 for so long as the inlet pressure is greater than the pressure within the container 2. It should also be noted that the pressure build-up within the main diaphragm chamber 104 will be communicated from said main diaphragm chamber into the annular chamber 186, where it will act to cause the pilot valve core assembly 198 to more firmly engage upon the pilot valve seat 196.

When it is desired to re-open the valve 4 to permit flow from the tank 2, all that is required is to lower the pressure within the inlet chamber 70 to a value below that of the pressure within the tank 2. When such a condition has been attained, the pressure within the container 2, which is in communication with the side of the main diaphragm 114 opposite to that which is exposed within the main diaphragm chamber 104, will cause the valve core assembly 116 to move away from the valve seat 88. This movement again opens the valve 4 for flow, which, in this instance, will be from the container 2 into the inlet chamber 70. The valve 4 will remain open until fluid is again caused to flow into the inlet chamber 70 through the inlet opening 66 at a pressure greater than that within the container 2, and until a subsequent pressure build-up occurs within the container 2 sufficiently great to again close the pilot valve 164 and cause the main valve core 116 to close.

During the emptying period when the pressure within the inlet chamber 70 is lower than that within the container 2, pressure will drain from the pilot valve chamber 186 through the port 248 in the disk 240. The pilot valve assembly 164 will be opened by the coil spring 228 as soon as the pressure within the annular chamber 186 is sufficiently lowered. It should be noted that the pressure decrease within the chamber 186 will be relatively slow, because of the relatively very small size of the port 248.

The pilot body 166 has an L-shaped passage 280 therein, which communicates with the space between the two diaphragms 200 and 202. The intermediate body 92 has an angled passage 282 therein which communicates at one end with said L-shaped passage 280, and at its opposite end with a vent passage 284 contained within one of the ribs 64. Thus, the space between the two diaphragms 200 and 202 of the pilot valve core 198 is vented to the atmosphere, and no pressure build-up can occur therein which would adversely affect the operation thereof.

As has been described hereinabove with respect to the operation of the filling valve 4 of the invention, fluid pressure must be maintained within the inlet chamber 70 if the main valve core 116 is to remain in its closed position; further, the pressure within the inlet chamber 70 must be greater than the pressure within the container 2.

The pressure within the inlet chamber 70 can be easily maintained for as long as a supply conduit is connected with the filling valve 4. It usually is desirable, however, to disconnect the supply pipe from the filling valve 4 when a tank 2 has been filled, especially if the tank is to be transported to another location. Thus, it is necessary to provide another means for retaining fluid pressure within the inlet chamber 70 if the main valve core 116 is to remain closed after the valve 4 is disconnected from the supply conduit. The valve of FIG. 3 is provided with a check valve 286, which functions to retain pressure within the inlet chamber 70 after the supply conduit has been disconnected therefrom.

Figure 8:
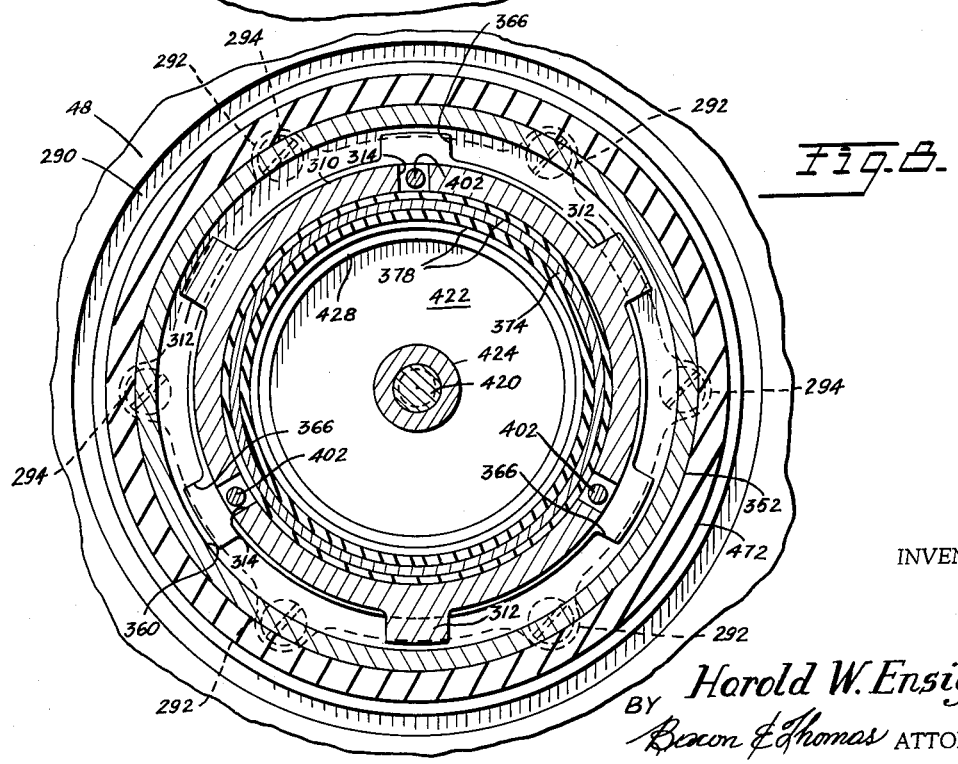
FIG. 8 is a sectional view through the forward end of the filling nozzle and through the adapter flange mounted on the tank filling valve, and is taken along the line 8—8 of FIG. 3.

Referring now to FIGS. 3, 7 and 8, an adapter ring 288 is in engagement with the outer end face 290 of the main valve body 40, and has a plurality of circumferentially spaced, radially extending tabs 292 (FIGS. 7 and 8) thereon. The tabs 292 have bores therethrough for receiving screws 294, said screws 294 being secured within threaded bores 296 in the end face 290, whereby the adapter ring 288 is secured to the main valve body 40. The annular adapter ring 288 has a cylindrical collar 298 on the inner periphery thereof, said collar having a diameter slightly less than that of and being received within the inlet opening 66. An O-ring seal 300 is positioned within a groove in the face of the adapter 288 which engages the end face 290, and functions to secure the juncture of the adapter ring 288 and the main body 40 against fluid leakage.

The adapter 288 has a radially inwardly directed flange 302 medially thereof, and a curved wall 304 extends between the collar 298 and said flange 302. The flange 302 is provided with a central cylindrical opening 306, and the adapter body 288 has a cylindrical socket 308 in its outer end which communicates with said opening 306. Thus, the opening 306 defines an inlet opening into the inlet chamber 70.

The outer end of the adapter 288 has an annular flange 310 thereon, said flange 310 being provided with three circumferentially spaced, radially projecting, rectangular lugs 312 on the periphery thereof. The radial end face of the flange 310 is provided with three circumferentially spaced, radially extending notches 314, which notches 314 have a depth equal to about one-third of the thickness of the flange 310. The notches 314 and the lugs 312 are spaced equally from each other, as is best shown in FIG. 8, so that each lug 312 is displaced 60 degrees from an adjacent notch 314. The function of and purpose for the lugs 312 and the notches 314 will be explained in greater detail hereinafter.

Disposed within the inlet chamber 70 and attached to the adapter 288 is a check valve supporting bracket 316, said bracket including a hub 318 having three circumferentially spaced, angled legs 320 projecting forwardly therefrom. The legs 320 terminate in feet 322 (FIG. 7), which feet 322 are provided with bores for the reception of screws 324. The screws 324 are secured within threaded bores in the adapter 288, and function to secure the bracket 316 in position within the inlet chamber 70.

The hub 318 includes a cylindrical body 326 having a flange 328 thereon, the legs 320 being formed integrally with said flange 328. The cylindrical body 326 has a cylindrical bore 330 therethrough, positioned concentrically about the longitudinal axis of the inlet chamber 70 and the inlet opening 306 in the adapter 288. A valve stem 332 is received within the bore 330, said valve stem having four equally spaced, longitudinally extending, arcuate, grooves 334 formed therein (FIGS. 3 and 7).

A radial disk 336 is formed integrally with the forward end of the stem 332, and defines a valve core which cooperates with the valve seat defined by the confronting inner face of the flange 302. The disk 336 has a circular boss 338 on the front face thereof, the edge 340 of said boss 338 being chamfered. The disk 336 has a diameter substantially greater than that of the opening 306, and has an annular groove 342 formed therein in position to confront the radial flange 302. An O-ring seal 344 is received within said groove 342, and is arranged to sealingly engage the flange 302 when the stem 332 is in its forward position.

The flange 328 of the bracket 316 has an annular groove 346 therein positioned to confront the disk 336, and the latter has an annular groove 348 in the rear face thereof having an outer diameter larger than that of the groove 346. A coil spring 350 has its opposite ends received within the grooves 346 and 348, and functions to urge the valve disk 336 forwardly into engagement with the radial flange 302. Thus, the valve core, or disk, 336 operates in the manner of a spring-biased check valve to seal the inlet chamber 70 when there is no force acting to hold said check disk 336 open. A fluid supply line may thus be disconnected from the filling valve 4, and the check valve 286 will retain sufficient pressure within the inlet chamber 70 to insure that the main valve core 116 will remain in its closed position. The container 2, with the filling valve 4 mounted therein, may thus be readily transported from one location to another.

The check valve 286 is intended to be operated by the filling nozzle 6, the construction of said nozzle being best shown in FIGS. 1, 3 and 8–11. Referring to FIG. 3, the nozzle 6 includes a cylindrical body 352 having a plurality of circumferentially spaced supporting arms 354 (FIG. 9) extending rearwardly therefrom, said arms 354 functioning to support a rectangular in cross-section annular ring 356. The front face of the cylindrical body 352 has a short, cylindrical recess 358 therein, and an inwardly opening peripheral groove 360. The recess 358 and the groove 360 have identical diameters, and are separated by a radially directed flange 362, said flange 362 having a tapered wall 364 on its inner forward edge.

As is best shown in FIGS. 8 and 10, the flange 362 has three radially extending, circumferentially spaced notches 366 therein, each of said notches 366 being sufficiently large to freely receive one of the similarly spaced lugs 312. The groove 360 has a width just slightly greater than the thickness of the lugs 312, and thus the body 352 may be mounted on the adapter 288 in the well known bayonet manner.

The body 352 has a rearwardly opening, cylindrical socket 368 therein, the cylindrical wall of said socket having a circumferential ball-bearing receiving groove 370 therein. An annular ring 372 is received within the socket 368, and has a forwardly extending, relatively thin cylindrical collar 374 projecting forwardly from the inner edge thereof. The forward edge of said collar 374 has an inturned rim 376 thereon, and a resilient sleeve-type gasket 378 is received over said rim 376 and said collar 374. The gasket 378 has an outwardly-directed flange 380 on its rear end, which flange 380 is received within an annular groove in the ring 372.

An elbow conduit 382 is rotatably mounted to the body 352, and has a radial flange 384 on its forward edge of a diameter slightly less than that of the cylindrical socket 368. The flange 384 defines, together with the ring 372 and the groove 370, a ball-bearing race, and a plurality of ball-bearings 386 are disposed therein. The flange 384 has a plurality of circumferentially spaced bores extending therethrough for receiving screws 388, which screws 388 are threadably secured within bores in the annular ring 372 and function to secure the elbow 382 to the body 352.

The elbow member 382 has three circumferentially spaced, axially extending bosses 390 on the forward end thereof, positioned immediately behind the flange 384, and each of said bosses 390 has an axially extending bore 392 therein positioned to confront the annular ring 372. The annular ring 372 has three circumferentially spaced bores 394 therethrough, each positioned to confront one of the bores 392, and all having a smaller diameter than that of said bores 392. A locking pin 396 is received with each of the bores 394, and is urged forwardly by a coil spring 398 disposed therebehind within an associated confronting bore 392.

The locking pins 396 function to retain the elbow member 382 rotatably fixed relatively to the body 352, except when the nozzle 6 is coupled onto the adapter body 288. Each pin includes a cylindrical body 400, having a diameter slightly less than that of the cylindrical bore 394 within which it is slidably received, and a reduced-in-diameter, forwardly extending, cylindrical nose portion 402. The annular groove 360 is separated from the cylindrical socket 368 by a radially extending wall 404, said wall having a cylindrical opening 406 extending therethrough (see also FIG. 10). The cylindrical wall defining the opening 406 has three circumferentially spaced, axially extending, arcuate recesses 408 therein (FIGS. 10 and 3), within which the cylindrical bodies 400 of the pins 396 are received when the body 352 and the elbow member 382 are properly rotatably positioned, and the pins 396 are in their forward position. The cylindrical opening 406 has a diameter sufficiently great so that the cylindrical wall thereof lies radially outwardly of the reduced pin nose portions 402.

The nozzle 6 is installed on the flange 310 in the following manner. Initially, the body 352 is aligned with the flange 310 so that the notches 366 are aligned with the lugs 312. The body member 352 is then telescoped over the flange 310, and said lugs 312 are received within the annular groove 360. Simultaneously, the reduced nose portions 402 of the locking pins 396 will be received within the notches 314, and will be depressed against their associated springs 398 (FIG. 3). The depth of the notches 314 is sufficient so that the relatively large body portions 400 of the locking pins 396 will be positioned rearwardly of the recesses 408 when the flange 310 is fully received within the groove 360. Thus, when this position has been attained, the body member 352 may be rotated relative to the elbow 382 and the flange 310 to position the notches 366 midway between the lugs 312. The nozzle member 6 will then be secured in position on the adapter 288, and hence on the filling valve 4.

To facilitate turning of the body 352, a pair of handles 410 are secured in diametrically opposed relationship to the ring 356 by bolts 412.

The filling nozzle 6 is provided with means for opening the check valve 286, which means is operable only when the filling nozzle 6 is properly coupled on the adapter ring 288. Referring again to FIG. 9, the elbow member 382 has a cylindrical guide collar 414 supported concentrically within the forward end thereof by a radial support post 416 that extends from the side wall of said elbow. The guide collar 414 has a cylindrical bore 418 extending axially therethrough, within which is slidably received an operating shaft 420.

The forward end of the shaft 420 is threaded, and a disk 422 is secured thereto. The disk 422 includes a boss 424 having a threaded bore therein for reception of the forward end of the shaft 420, a locking pin 426 being passed through said boss 424, and said shaft 420 to insure that the two will remain in coupled relationship. The disk 422 has a cylindrical outer rim 428 thereon, which is snugly received within the sleeve gasket 378, said rim 428 lying under the inwardly directed rim 376. The rim 376 insures that a tight sealing relationship will exist between the gasket 378 and the cylindrical rim 428.

The elbow conduit 382 is provided with a cylindrical boss 430 on the exterior thereof behind the annular ring 356, said boss having a threaded radial bore 432 extending therethrough. A threaded collar 434 is received within the threaded bore 432, and has a radial flange 436 on the outer end thereof which engages with the end face of the boss 430; an O-ring seal 438 is positioned between the collar 434 and the boss 430 to prevent fluid leakage therethrough.

A shaft 440 extends completely through a bore 441 within the collar 434, and terminates adjacent the center line of the conduit 382 in a crank arm 442. The crank arm 442 has a cylindrical stop shaft 444 extending forwardly therefrom concentric to the axis of the shaft 440, and a crankpin 446 projects forwardly from the end of said crank arm 442.

The rear end 448 of the shaft 420 is bifurcated, and one end of a connecting link 450 is pivotally secured within said bifurcated end 448 by a rivet 452. The opposite end of the link 450 has a downwardly extending actuating arm 454 thereon (FIG. 11), said arm 454 having a bore 455 therethrough at its lower end through which the crankpin 446 extends. The arm 454 is secured in position on the crankpin 446 by a pin 456 passing through a bore in the latter. The arm 454 defines, together with the body of the link 450, a bend 458 positioned to engage the stop shaft 444. The link 450 operates in an over-center manner to cause axial translation of the shaft 420 when shaft 440 is rotated.

The normal, closed position for the disk 422 is that shown in FIG. 9. When the disk 422 is in said closed position, the link 450 is disposed to rest on the stop shaft 444 in an over-center manner, as shown in FIG. 11. When it is desired to operate the shaft 420 to urge the disk 422 forwardly, the shaft 440 is rotated counterclockwise, as viewed in FIG. 11. The crank arm 442 and the crankpin 446 will then cooperate with the pivoted link 450 to move the disk 422 forwardly out of the body 352.

As is best shown in FIG. 3, when the disk 422 is thus moved forwardly while the nozzle 6 is coupled to the valve 4, it will engage the boss 338 on the check valve disk 336, and will move said check valve disk 336 to its open position (indicated by phantom lines in FIG. 3). The check valve 286 may be closed while the nozzle 6 and the filling valve 4 are in coupled relationship merely by rotating the operating shaft 440 in a clockwise direction.

The operating shaft 440 is manipulated by a handle 460, said handle including a disk 462 having a cylindrical bore 464 therethrough of a size to receive the outer end of the shaft 440. The disk 462 is secured to the shaft 440 by a pin 466, and thus the shaft 440 will rotate together with the disk 462 when the handle 460 is properly manipulated.

As is best shown in FIGS. 1 and 9, the disk 462 is circular except for one tangentially flat side 468. The ring 355 has a locking land 470 in position thereon to engage the flat side 468 of the disk 462 when the body 352 is in such angular relation to elbow 382 that the cylindrical body portions 400 of the locking pins 396 are disposed within the recesses 408. When the land 470 is so engaged with the flat side 468 of the disk 462, the latter cannot be rotated, and hence the shaft 420 cannot be translated.

The body portions 400 of the locking pins 396 will be disposed within the recesses 408 except when the nozzle 6 is properly coupled to the flange 310 on the adapter ring 288. When the locking pins 396 are so positioned, the elbow 382 cannot be rotated relative to the body 352, and hence the flat side 468 of the disk 462 will remain in engagement with the land 470. The nozzle 6 thus incorporates a safety feature which insures against accidental opening thereof when the nozzle 6 is not properly coupled to the filling valve 4.

The forward end of the body 352 has a resilient sleeve 472 received on the exterior thereof, which sleeve 472 acts as a shock absorber in the handling of the nozzle 6. The aft end of the elbow member 382 has a coupling flange 474 mounted thereon (FIG. 1), and a supply conduit 476 having a similar flange 478 thereon is secured to said flange 474 by bolts 480.

The operation of the filling valve of FIG. 1 has been explained hereinabove, but will be briefly described again with relation to the filling nozzle 6. Initially, the filling valve 4 is positioned within a collapsed container 2, and the check valve 286 will be closed. When it is desired to fill the tank 2, the nozzle 6 is mounted on the adapter ring 288 in the manner described hereinabove, after which the handle 460 can be operated to open the check valve 286.

Fluid under pressure is then pumped through conduit 476 into the inlet chamber 70 of the filling valve, where it will open the main valve core 116. The fluid will then flow into the container 2 through openings 90, and will continue to do so until the pressure within said container 2 attains the desired preselected value. When the internal pressure within the container 2 has attained said preselected pressure value, the pilot valve apparatus 164 will close the outlet port 194 in the manner already described, and a pressure build-up will occur within the main diaphragm chamber 104. When pressure has built up sufficiently within the diaphragm chamber 104, the main valve core 116 will close, flow through the filling valve 4 will cease, and the nozzle 6 can then be removed.

Before removing the nozzle 6, the handle 460 is operated to close the check valve 286. It should be noted that the pressure contained within the inlet chamber 70 will function to hold said check valve 286 in its closed position. After the valve 286 has been closed, the nozzle 6 can be removed from the adapter ring 288 without the danger of the main valve core 116 opening. The filling valve 4 will remain in its closed position for so long as the confined pressure within the inlet chamber 70 has a value greater than the pressure within the tank 2. The tank 2 may therefore be transported from one location to another without danger of leakage through the filling valve 4.

When it is desired to empty the tank 2, the nozzle 6 is reconnected to the adapter ring 288; in this instance, however, the conduit 476 is not connected to a source of pressurized fluid, but rather is either connected to an evacuating pump or is merely opened to atmospheric conditions. After the nozzle 6 has been coupled to the filling valve, the handle 460 is manipulated to open the check valve 286. The pressure within the inlet chamber 70 will then be quickly relieved through the conduit 476 to a value substantially less than that of the pressure of the fluid within the container 2. The pressurized fluid within the container 2 will then act on the diaphragm 114 to open the main valve core 116, and outflow will begin from the container 2.

After the filling valve 4 has been open for a short period, the chamber 186 will drain sufficiently through the port 248 to permit the pilot valve to open outlet port 194. Thereafter, no pressure build-up will occur within the chamber 104, and the main valve core 116 will remain in its open position until the tank is substantially completely empty.

The nozzle 6 can be disconnected and the check valve 286 closed at any time during emptying of the tank 2. The check valve 286 will function to retain the remainder of the fluid within the container 2, even though the main valve core 116 is open. If it is desired to refill a partially empty tank 2, this can be accomplished by connecting a nozzle 6 to the filling valve 4 and supplying fluid under pressure to the inlet chamber 70. The filling valve 4 will then again function in a manner identical to that described hereinabove to fill the tank 2 with fluid, until the desired preselected pressure value is attained therein; when such pressure is attained, the main valve core 116 will again be closed.

It is thus seen that the internally mounted filling valve 4 of FIGS. 1 through 11 is designed to facilitate easy filling and emptying of its associated container 2, and that the container 2 may be filled automatically to a preselected pressure value. It has been found that with proper sizing and design of the various passages and valve components, the valve of the present invention can easily respond to a close tolerance.

The internally mounted filling valve 4 of FIGS. 1–11 also has another unique feature in that the valve 4 is substantially fully protected against impact damage. This occurs because the valve 4 is mounted within the container 2, and normally cannot be reached by foreign objects. It has been found that a tank 2 containing the filling valve 4 of FIG. 1 may be dropped several feet without in any way causing damage to said valve.

Referring now to FIGS. 12–14, a modified ambodiment of the valve of FIG. 1 is shown incorporating another type of nozzle and another type of closure device for the inlet chamber. Referring to FIGS. 12 and 14, a collapsible tank is indicated at 482 having an end wall 484, said end wall having a central opening 486 therein. An annular, inner mounting collar 488 is positioned on the interior of the end wall 484, said collar 488 including a forwardly-projecting cylindrical projection 490 (FIG. 14) having an external diameter corresponding to that of the opening 486, and a length corresponding to the thickness of the wall 484. An outer annular ring 492 is positioned on the exterior of the end wall 484, and has an annular groove 494 on the inner peripheral edge thereof positioned to confront the end wall 484. A main valve body 40 is received through the opening in the collar 488, said valve body 40 being identical to that shown in FIG. 3, and having a flange 44 thereon. The flange 44 is received within the groove 494 in the outer ring member 492, and O-ring seal 46 is provided to prevent leakage.

The inner collar 488 has a plurality of circumferentially spaced bosses 496 thereon, and is provided with a plurality of threaded bores 498 extending into said bosses 496 and positioned to confront the end wall 484. The outer ring 492 has a like plurality of bores 500 therein positioned to confront the threaded bores 498, and a plurality of bolts 502 are received within said bores 498 and 500 and pass through the end wall 484 of the tank 482 to secure the main valve body 40 in position.

The valve body 40 has an adapter ring 504 secured to the forward face 290 thereof by a plurality of circumferentially spaced bolts 506. The adapter ring 504 includes a cylindrical projection 505 which extends through the inlet opening 66 in the main valve body 40, and said ring 504 has a threaded cylindrical opening 508 extending completely therethrough.

A filling nozzle 510 is mounted within the adapter ring 504, said filling nozzle 510 including a body 512 having threads on the forward end thereof of a size to mesh with the threads within the bore 508. The body 512 terminates at its forward end in a radially inwardly directed flange 514, said flange 514 having an inlet opening 516 extending therethrough; the front face of the flange 514 defines a valve seat that surrounds the opening 516.

The body 512 has a concentrically positioned collar 518 supported therewithin by an end wall 520, said collar 518 extending axially on both sides of said end wall 520. The collar 518 has a threaded bore 522 extending through its forward end, and has a large counterbore 524 in its outer end. The counterbore 524 is positioned concentrically of the longitudinally axis of the threaded bore 522, and is separated from said bore 522 by an intermediate counterbore 526.

A shaft 528 extends through the collar 518, the forward end of said shaft 528 being threaded to mesh with the threads within the bore 522. The outer end of the shaft 528 terminates in a head 530 having a hexagonal, wrench-engaging recess 532 therein (FIG. 13), and a seal 534 is positioned within the intermediate counterbore 526 about said shaft 528. The shaft 528 may thus be translated within the bore 522 by inserting a suitable wrench into the recess 532 and turning said shaft.

The forward end of the shaft 528 has a valve core 536 mounted thereon, said core including a disk 538 having an annular recess 540 in its rear face positioned to confront the radial flange 514. The outer diameter of said recess 540 is less than the diameter of the threaded bore 508, and the inner diameter thereof is less than the diameter of the inlet opening 516. A resilient ring 542 is seated within the recess 540 in position to engage the valve seat defined by the front face of the flange 514.

A housing 544 having a flange 546 thereon is secured to the rear face of the disk 538 by bolts 548, which bolts 548 pass through bores in the flange 546 and engage within threaded bores in the disk 538. The housing 544 has a socket 550 in the front face thereof, and a bore 552 extends through the bottom wall of said socket 550 and is positioned in alignment with the shaft 528. The forward end of the shaft 528 extends through said bore 552 into the socket 550, and has a nut 554 threaded thereon; a pin 556 is passed through the nut 554 and the forward end of the shaft 528, and secures said two members together against relative rotation. Thus rotation of the shaft 528 within the threaded bore 522 will cause the disk 538 to move toward and away from the valve seat defined by the flange 514.

The filling nozzle body 512 has a threaded portion 558 attached thereto, which in use may be connected to a fluid supply line. The filling valve 4 of FIGS. 12–14 is identical to that of FIGS. 1–3, except for the adapter ring 504 and the check valve 560 defined by the filling nozzle 510 and the disk 538. The device of FIGS. 12–14 functions in the following manner.

The filling nozzle 510 will normally be permanently mounted within the adapter ring 504, which adapter ring 504 itself will be permanently secured to the filling valve 4. Initially, the tank 482 will be empty, and the check valve 560 will be closed; that is, the disk 538 will be in sealing engagement with the valve seat defined by the front face of the flange 514. When it is desired to fill the container 482, a fluid supply conduit is threaded onto the fitting 558, and fluid is pumped into the filling nozzle body 512. The shaft 528 may then be manipulated by a suitable wrench to open the check valve 560. Fluid will then flow into the inlet chamber 70, and the filling valve 4 will operate in the manner hereinabove described to fill the container to its desired internal pressure.

When the desired internal pressure has been attained within the tank 482, the filling valve 4 will close, in which position it will remain for so long as the pressure within the inlet chamber 70 is greater than that within the tank 482. This pressure can be maintained by leaving the inlet chamber 70 connected to a source of fluid pressure, or the check valve 560 may be closed to seal said inlet chamber 70.

Normally, it will be desirable to disconnect the fitting 558 from the fluid supply conduit. Before this is done, the shaft 528 will be manipulated to cause the disk 538 to again engage the radial flange 514, thus closing the check valve 560. The fluid supply conduit can then be disconnected from the fitting 558, and a cap 559 mounted thereon to seal off said fitting and prevent damage to the threads thereon. The tank 482 may now be freely transported without danger of leakage through the filling valve 4.

When it is desired to empty the fluid from the tank 482, a suitable conduit is connected to the fitting 558, and the check valve 560 is opened. By draining the pressure from the inlet chamber 70, the main valve core 116 of the filling valve 4 may be opened in the manner hereinabove described. It is thus seen that the embodiment of FIGS. 12–14 functions in a manner substantially identical to that described for the embodiments of FIGS. 1 through 11.

The filling valve embodiments of FIGS. 1 through 14 are constructed for mounting within a container, which mounting can offer unique advantages, as discussed hereinabove. However, in many instances it is not desirable to mount a filling valve with a container. For example, if a particular container seldom is used, it would be economically wasteful to permanently mount a filling valve therein. Further, in some instances it is desirable to utilize a single filling valve to fill several containers, which single valve is permanently connected to a fluid supply line. Therefore, an externally mounted embodiment of the filling valve of the invention is illustrated in FIGS. 15–19.

Referring now to FIG. 15, a collapsible container is indicated at 562, said container having an external filling valve 564 connected therewith through a Venturi nozzle 566, and a filling nozzle 6a, similar to the filling nozzle 6. The container 562 is similar to the container 2 of FIG. 1, except that the internal filling valve 40 has been omitted and a smaller opening is provided in the ring 16a so that the adapter 288 and check valve 286 are mounted upon said ring. Otherwise, corresponding parts have been identified by the same reference numerals. It will be understood that the filling nozzle 6a is connected with the adapter ring 288 and cooperates with the check valve 286 in the same manner previously described in connection with FIG. 3.

Referring to FIG. 16, the Venturi nozzle section 566 includes a cylindrical body 576 having a flange 578 at one end thereof, which is attached by a plurality of bolts 580 to a flange 581 on the filling nozzle 6a. The Venturi nozzle section 566 also includes a short, convergent chamber 582, and an immediately adjacent, relatively long divergent section 584, the juncture of the sections 582 and 584 defining a nozzle throat 586.

The filling valve 564 comprises a main body 590 having axially aligned, threaded inlet and outlet openings 592 and 594 (FIG. 19) respectively therein. One end 588 of the body 576 is threaded into the outlet opening 594, thus connecting the filling valve 564 in communication with the container 562. The inlet opening 592 has a supply conduit 596 secured therewithin, which conduit functions to supply pressurized fluid to the filling valve 564.

The main body 590 includes therein an inlet chamber 598 and an outlet chamber 600, said chambers 598 and 600 being separated by a wall 602. The wall 602 includes a horizontally disposed portion 604, having a threaded cylindrical opening 606 extending therethrough. A sleeve 608, having threads on its lower end, is secured within the threaded opening 606, and extends upwardly into the outlet chamber 600; the upper end face 610 of the sleeve 608 is convexly shaped, and defines a valve seat.

The top, radial face 612 of the main body 590 has a cylindrical opening 614 therein, said opening being positioned to confront and having a larger diameter than the sleeve 608. A frusto-conical wall 616 extends between top radial face 612 and the cylindrical opening 614.

Disposed to rest upon the main body 590 is an intermediate valve body 618, said intermediate body 618 including a rectangular flange 620 on its lower end having a cylindrical recess 622 in its lower end face. The cylindrical recess 622 has a diameter slightly greater than the top cylindrical top portion 624 of the main valve body 590, and is received thereover. The intermediate body 618 is secured to the main body 590 by four bolts 626 (FIGS. 16 and 19), which pass through bores in the flange 620 and engage within threaded bores in the main valve body 590.

The intermediate body 618 has a main diaphragm chamber 628 in its lower face, and a cylindrical chamber 630 in its upper face, said chambers being separated by a wall 632. The main diaphragm chamber 628 includes a frusto-conical portion 634 corresponding in size and being oppositely tapered to the frusto-conical wall 616. An intermediate cylindrical section 636 is in communication with the frusto-conical chamber portion 634, and a relatively small cylindrical portion 638 communicates with said intermediate portion 636.

A main diaphragm 640 is secured between the opposed faces of the rectangular flange 620 and the main body 590 and extends across the main diaphragm chamber 628. The main diaphragm 640 supports a main valve core 642, which core 642 includes a main disk 644 positioned beneath the diaphragm 640, and a disk 646 positioned above said diaphragm 640. The peripheral edge 648 of the main disk 644 which confronts the diaphragm 640 is rounded, and the bottom face of the top disk 646 has a boss 650 thereon which engages said diaphragm 640. The disks 644 and 646 have identical diameters, which diameters are substantially less than the diameter of the cylindrical opening 614. The top disk 646 and the diaphragm 640 have aligned bores therethrough, and a bolt 652 is passed through said bores and is received within a threaded bore 654 in the main disk 644 to secure the valve core components together.

The lower face of the main disk 644 has an annular recess 656 therein positioned to confront the rounded valve seat 610, said recess having a resilient ring 658 received therewithin. It is thus seen that when the valve core 642 is in engagement with the valve seat 610, no fluid can flow from the inlet chamber 598 through the sleeve 608 and into the outlet chamber 600. However, when the main diaphragm 640 shifts upwardly to raise the valve core 642 above said valve seat 610, fluid will flow between the inlet and the outlet chambers.

Disposed to rest upon the intermediate body 618 is a pilot valve assembly 660, said pilot valve assembly 660 including a pilot body 662 and a cover 664. The cover 664 includes a frusto-conical dome portion 666, having a flange 668 at its lower end, said flange 668 being disposed to rest upon the pilot body 662. The flange 668 has a plurality of circumferenitally spaced bores 670 extending therethrough. The pilot body 662 has a plurality of bores 672 therein positioned to confront the bores 670. Bolts 674 (FIG. 19) pass through the aligned bores 670 and 672 and are secured within threaded bores 676 in the intermediate body 618.

The pilot body 662 has a cylindrical recess 678 in the lower end face thereof, said recess 678 having the same diameter as and being positioned to confront the cylindrical chamber 630. The pilot body 662 also has a smaller, centrally positioned cylindrical recess 680 in its top face, said recesses 678 and 680 in its top face, said recesses 678 and 680 being separated by a wall 682 having a cylindrical opening 684 extending therethrough.

The cover member 664 has a centrally positioned annular chamber 686 therein, which communicates at its lower end with a cylindrical recess 688. The cylindrical recess 688 is positioned to confront and has the same diameter as the cylindrical chamber 680 in the pilot body 662. A collar 690 is positioned concentrically within the annular chamber 686, and has a cylindrical outlet port 692 in its lower end. A lip 694 surrounds the lower end of the outlet port 692, and defines a pilot valve seat. The outer end of the collar 690 is provided with a threaded counterbore 696, within which is received an elbow fitting 698.

A pilot valve core assembly 700 is received within the pilot valve assembly 660, and is supported by a differential diaphragm arrangement substantially identical to that described hereinabove with reference to FIG. 3. A lower diaphragm 702 is positioned between the pilot body 662 and the intermediate body 618, and an upper diaphragm 704 is secured between the cover member 664 and the pilot body 662. An upper and a lower diaphragm disk 706 and 708, respectively, engage the opposite sides of the upper diaphragm 704, and a similar pair of diaphragm disks 710 and 712 engage the upper and lower sides, respectively, of the lower diaphragm 702. A cylindrical spacer 714 is positioned between the diaphragm disks 708 and 710, and the diaphragm disks 706, 708 and 710, as well as the diaphragms 702 and 704, have centrally positioned bores therethrough in alignment with the cylindrical bore through said spacer 714.

The lower disk 712 on the lower diaphragm has a reduced bore 716 extending therethrough, and has an enlarged counterbore in its upper face positioned to confront the bores within the other disks 706, 708 and 710. A valve stem 718, having a hexagonal head 720 thereon, is passed through the aligned bores in the valve disks 706, 708 and 710, and in the two diaphragms 702 and 704, and is received within the counterbore in the diaphragm disk 712. The stem 718 has a threaded bore in its lower end, and a screw 722 is passed through the bore 716 and is received with said threaded bore in the stem 718 to secure the components of the pilot valve core 700 together.

The top face of the hexagonal head 720 of the valve stem 718 has a recess therein, within which is disposed a resilient core 724; the core 724 has a diameter greater than that of the valve seat defined by the lip 694. The end wall of the annular chamber 686 is provided with an annular recess 726, and one end of a coil spring 728 is received therewithin. The opposite end of the coil spring 728 engages the diaphragm disk 706 about the periphery of the hexagonal stem head 720, and the spring 728 thus functions to urge the valve core 700 away from the valve seat 694.

The main body 590 has a threaded bore therein (not identified) in communication with the inlet chamber 598, and an elbow fitting 730 is threaded within said bore. The intermediate body 618 has a horizontal passage 732 therein, said passage 732 terminating at its outer end in a threaded counterbore 734; a radial shoulder 736 is defined between the two bores 732 and 734. The intermediate body 618 also has a vertical passage 738 therein, which communicates the horizontal passage 732 with the diaphragm chamber 628.

A disk 740, having an orifice 742 therein, is positioned against the shoulder 736, and a fitting 744 is threaded into the counterbore 734 against said disk 740. A conduit 746 is connected at one end to said fitting 744, and the other end thereof is connected to the elbow 730 by a fitting 748; thus, pressure from the inlet chamber 598 can flow through elbow 730, conduit 746, orifice 742, the passages 732 and 738, and into the diaphragm chamber 628. The purpose for the orifice disk 740 will be more fully described hereinafter.

The main diaphragm chamber 628 of the valve of FIG. 19 is in communication with the chamber 686 within the pilot valve 660, in a manner similar to that described hereinabove with respect to the filling valves of FIGS. 1–14. The intermediate body 618 is provided with an angled passage 750 which extends from the diaphragm chamber 628 to the top face 752 of said intermediate body 618. The pilot body 662 has a vertical passage 754 therein, positioned to confront the upper end of the passage 750; the top face 756 of the pilot body 662 has an annular recess 758 therein positioned to surround the upper end of the vertical passage 754. The inner diameter of the recess 758 is greater than the diameter of the passage 754, whereby a valve seat 760 is defined about the upper end of said vertical passage 754. The valve seat 760 terminates a short distance below the top face 756 of the pilot body 662, and a check valve plate 762, having a very small bore 764 therein, is disposed to rest upon said valve seat 760. The check valve plate 762 has a configuration identical to that of the check valve plate 240, FIG. 4.

The cover 664 has an angled passage 766 therein, the upper end of said angled passage 766 being in communication with the chamber 686. The lower end of said passage 766 terminates in a conical recess 768 positioned to confront the valve seat 760. The valve seat 760 is recessed below the top face 756 of the intermediate body 662 sufficiently to permit the plate 762 to move vertically a distance adequate to provide the desired rate of by-pass flow therearound. The passageway defined by the bores 750, 754 and 766 thus communicates the main diaphragm chamber 628 with the pilot valve chamber 868. It should be noted that said passages 750, 754 and 766 each have a diameter substantially greater than that of the orifice 742, whereby an undesirable pressure build-up within the main diaphragm chamber 628 is prevented, in a manner similar to that described hereinabove with reference to FIG. 3.

The pilot body 662 is provided with a horizontal passage 770 (indicated by broken lines) that vents the confined volume between the diaphragms 704 and 702 to atmosphere, said passage 770 opening into the cylindrical chamber 680. A short, vertical passage 772 (also indicated by broken lines) communicates the chamber 678 with said passage 770, and facilitates venting of the space between the two diaphragms. The two diaphragms 702 and 704 define a differential diaphragm arrangement similar to that described hereinabove with respect to FIG. 3, and thus the top surface of the upper diaphragm 704 and the bottom surface of the lower diaphragm 702 are placed in communication with each other. The cover member 664 is provided with an angled passage 774, which extends from the chamber 686 to the lower face 776 of said cover member 664. The pilot body 662 has a vertical passage 778 therein positioned to confront the lower end of said angled passage 774, and the intermediate body 618 has an L-shaped passage 780 therein which confronts the vertical passage 778 and communicates it with the diaphragm chamber 630. Thus, pressure transmitted from the main diaphragm chamber 628 to the pilot chamber 686 will be communicated to both the top surface of the diaphragm 704 and the bottom surface of the diaphragm 702; the diaphragms 702 and 704 are, of course, provided with openings (not numbered) which confront the passages 750, 754, 764, 766, 774 and 778.

The nozzle body 576 is provided with a bore 782 (FIGS. 16 and 17) which opens at the nozzle throat 586, the outer end of said bore 782 including a threaded counterbore 784. The center leg of a T-fitting 786 is threaded into said counterbore 784. One end of a conduit 788 is attached to the downwardly directed leg of said T-fitting 786 by a fitting 790, and extends underneath the nozzle body 576, and then vertically upwardly to one end of a T-fitting 794, to which it is attached by a fitting 796.

The elbow fitting 698 has one end of a conduit 798 secured thereto by a fitting 800, and the other end of said conduit 798 is connected by a fitting 801 to the leg of the T-fitting 794 which is in alignment with the end of said T-fitting 794 to which the conduit 788 is connected. Thus, the outlet port 692 is placed in communication with the throat 586 of the nozzle 566 by conduit 798, T-fitting 794, conduit 788 and T-fitting 786.

The center leg of the T-fitting 794 has one end of a blowdown valve 802 attached thereto. The intermediate body 618 is provided with a horizontal bore 804 therein, which terminates at its outer end in a threaded counterbore 806. A passage 808 communicates the chamber 630 with the bore 804. A nipple 810 has one end thereof threaded within the counterbore 806, and the opposite end thereof is secured within the other end of the blowdown valve 802.

The blowdown valve 802 includes a body 812 having a pair of oppositely directed, threaded bores 814 and 816 therein; the center leg of the T-fitting 794 is received within the threaded bore 816, and the outer end of the nipple 810 is received within the threaded bore 814. A vertical cylindrical bore 818 extends completely through the valve body 812, and terminates at its lower end in an enlarged portion 820; the lower end of the through bore 818 is provided with a threaded counterbore 822. The external, upper end 823 of the body 812 has threads thereon, and a cap 824 is secured thereto.

The cap 824 has a bore 826 extending therethrough, through which passes a plunger shaft 828. The plunger 828 has a pair of spaced collars 830 and 832 thereon, each having a diameter just slightly less than that of the upper portion of the bore 818. The portion of the plunger shaft 828 that extends between the collars 830 and 832 has a reduced diameter, and the collars 830 and 832 carry O- ring seals 834 and 836, respectively, in peripheral grooves thereon.

An upwardly inclined passage 838 communicates the bore 814 with the portion of the cylindrical bore 818 disposed between the two collars 830 and 832. A downwardly inclined passageway 840 communicates the threaded bore 816 with the enlarged portion 820 of the through bore 818, and normally opens below the lower collar 832. A spring 842 is received within the enlarged bore portion 820, the upper end thereof being disposed about the lower end of the shaft 828 and engaging the lower face of the collar 832; a threaded end cap 844 is received within the threaded counterbore 822, and functions to secure the spring 842 in a compressed condition to urge the plunger 828 upwardly.

The blowdown valve 802 is closed to flow therethrough when the plunger shaft 828 is in its upper position, shown in FIG. 19. When it is desired to relieve pressure within the diaphragm chamber 630, and hence within the pilot valve chamber 586 through passages 774, 778 and 780, the plunger shaft 828 is pressed downwardly against the spring 842 until the two passages 838 and 840 are positioned between the collars 830 and 832. When this position has been attained by the plunger 828, fluid will readily flow from the chamber 630, through the nipple 810, the blowdown valve 802, the T-fitting 794, the conduit 788, and into the nozzle body 576.

The main valve body 590 has a threaded opening 591 in its side wall communicating with the outlet chamber 600, and with which opening is connected an elbow fitting 846. Needle valve 848 has one leg thereof threaded into the elbow fitting 846. The details of the needle valve 848 are best shown in FIG. 18 and will be seen to include a generally T-shaped body 850, having an axial bore 852 therein terminating at its outer end in a threaded counterbore 854. The bore 852 communicates with a cylindrical chamber 856 located within the body 850 at the juncture of the three legs thereof, said chamber terminating at its forward end in a radially directed flange 858.

The elbow fitting 846 has a threaded socket 860 therein for reception of one of the legs 862 of the body 850, and includes an integral, forwardly projecting cylindrical portion 864 that engages with the flange 858; the forward end of the cylindrical portion 864 is shaped complementary to meet with the flange 858, and has a cylindrical bore 866 therein.

A disk 868, having a frusto-conical bore 870 therethrough, is positioned within the chamber 856, and normally engages the flange 858. A partially compressed spring 872 is positioned with its opposite ends in engagement with the disk 868 and with the wall of the chamber 856 which confronts said disk 868. Thus, the spring 872 functions to maintain the disk 868 in engagement with the flange 858.

A needle core 874 is received within the body 850, and includes a threaded rear portion 876, a reduced-in-diameter intermediate cylindrical portion 878, and a conical needle nose 880. The cylindrical portion 878 has a diameter slightly less than that of the bore 852, and the wall defining said bore has an O-ring seal 882 therein. The needle nose 880 extends through the bore 870 in the disk 868, and thus the opening defined between said needle nose 880 and said bore 870 may be readily adjusted by threading the needle core 874 outwardly and inwardly within the threaded counterbore 854.

The center leg of the body 850 has a conduit 884 connected thereto by a fitting 886, the other end of said conduit 884 being connected to the upwardly directed leg of the T-fitting 786 by a fitting 887. Thus, the conduit 788 is placed in communication with the outlet chamber 600 through the needle valve 848, and with the throat 586 of the nozzle section 566.

The external filling valve 564 shown in FIGS. 15 to 19 preferably is permanently connected with the supply conduit 596 and with the filling nozzle 6a, the latter of which may be connected with successive containers similar to the container 562 to fill the same.

The external filling valve 564 operates in the following manner: Initially, the filling nozzle 6a is connected to a container 562 which is to be filled, the handle 460 is actuated to manually open the check valve 286, and fluid is then admitted through the supply conduit 596 into the inlet chamber 598 of the valve 564. When pressurized fluid is admitted to said inlet chamber, the main valve core 642 will be urged upwardly away from the valve seat 610. Thus, flow will occur from the inlet chamber 598 into the outlet chamber 600, through the Venturi nozzle body 576, through the filling nozzle 6a, past the check valve 286, and into the container 562.

A portion of the fluid pressure within the inlet chamber 598 will be transmitted through the conduit 746 and the orifice 742 into the main diaphragm chamber 628. However, during the early period of the filling operation, and until the pilot valve 660 is closed, the chamber 628 will be in communication with the pilot chamber 686, and the pilot chamber 686 will itself be in communication through the outlet port 692 with the nozzle throat 586. Thus, no pressure build-up can occur within the main diaphragm chamber 628 sufficient to cause the main valve core 642 to close.

The purpose for the Venturi nozzle 566 is to compensate for the variation in pressure drop between the valve body 590 and the container 562. The sensing port 782 positioned at the nozzle throat 586 senses the pressure at said throat, and transmits it to the T-fitting 786. The needle valve 848 receives pressure from the outlet chamber 600, and is also in communication with said T-fitting 786. The needle valve 848 may thus be adjusted to trim the pressure supplied from the T-fitting 786 to the pilot chamber 686. The orifice 742 is positioned to balance the internal passages within the filling valve 564, so that no pressure build-up will occur until the differential diaphragm unit 700 within the pilot valve 660 overcomes the force of the spring 728 and closes said pilot valve at the desired outlet pressure.

During filling of the tank, and as the pressure therein rises, the increasing pressure is transmitted through the conduits 788 and 798 to the pilot valve chamber 686, and from said chamber 686 to the lower differential diaphragm chamber 630. The area of the lower diaphragm 702 exposed within the chamber 630 is preferably about twice the area of the upper diaphragm 704 exposed within the chamber 686. Thus, as pressure increases within the chambers 686 and 630, the resulting forces across the two diaphragms 702 and 704 tends to overcome the spring 728 and close the pilot valve 660. When the tank pressure has attained a certain preselected value, the pilot valve 660 will close; when the pilot valve 660 closes, the main diaphragm chamber 628 will no longer be provided with an exhaust passage.

After the pilot valve 660 has closed, pressure will build up within the main diaphragm chamber 628 because of the continuing flow thereinto of pressure from the inlet chamber 598. This pressure build-up will move the diaphragm 640 downwardly, and cause the main valve core 642 to sealingly engage the valve seat 610. Flow will then cease through the valve 564, and the main valve core 642 will be held in its closed position by pressure transmitted from the inlet chamber 598 to the main diaphragm chamber 628. The area of the diaphragm 640 exposed within the diaphragm chamber 628 is considerably larger than the area of the main valve disk 644 exposed within the sleeve 608; this difference in area insures that the main valve core 642 will remain closed in the presence of inlet pressure within both the main diaphragm chamber 628 and the inlet chamber 598. The spring 728, like the spring 228, controls the shut-off point of the pilot valve 660, and thus is selected to cause the pilot valve 660 to close when the preselected outlet pressure is attained. The needle valve 848 permits fine adjustments in the shut-off pressure, and thus the filling valve if FIGS. 15 to 19 may be adjusted to operate within very close pressure tolerances.

After the main valve core 642 has closed, the nozzle 6a is disconnected from the container 562 and connected to a similar, empty container. It will be understood that upon disconnection of the filling nozzle 6a, the check valve 286 will first have been automatically closed to prevent fluid from escaping from the container. On the other hand, the container 562 can be left in position and emptied as needed through another outlet provided therein (not shown) or through the filling valve 564 in a manner to be hereinafter described. If the filling valve 564 is left connected to a container, and pressure is maintained within the outlet chamber 600, the pilot valve 660 will remain closed. Under these conditions, the main valve core 642 will also remain closed, for so long as the pressure within the inlet chamber 598 exceeds that within the outlet chamber 600.

The container 562 may be easily emptied, if desired, through the filling valve 564 in the following manner. The conduit 596 is first connected either to drain, or to an evacuating pump. This will cause the pressure within the inlet chamber 598 to drop below the pressure within the outlet chamber 600. Further, pressure will also be withdrawn from the main diaphragm chamber 628 through the conduit 746. The check valve plate 762 will prevent pressure from the outlet chamber 600 from flowing from pilot valve chamber 686 into the main diaphragm chamber 628, except for a very small flow through the bore 764. Thus, pressure will drop within the main diaphragm chamber 628.

The pressure within the outlet chamber 600 will then act on the lower face of the diaphragm 640 and the exposed surfaces of the main disk 644, to urge the main valve core 642 upwardly. Flow will then occur from the outlet chamber 600, through the sleeve 608, and into the inlet chamber 598. Thus, the filling valve 564 may be utilized to both fill and empty a container. When it is desired to again fill the container 562, the flow through the inlet conduit 596 is reversed so that the pressure therein exceeds that within the container 562, and thereafter the valve 564 functions in the manner hereinabove described.

After the container 562 is emptied by other means (not shown), or after the nozzle 6a is disconnected from the container 562 and another container attached thereto, the opening of the filling nozzle disk valve 422 will drop the pressure in the outlet chamber 600 of the main valve. However, the pressure within the main diaphragm chamber 628 will still hold the main valve disk 642 in its closed position. Further, the pressure contained within the closed pilot valve 660 will act on the differential diaphragm 700 to hold said pilot valve tightly closed. Thus, the filling valve 564 will remain in its closed position, even when the pressure within the outlet chamber 600 has been depleted.

Because the pressure within the pilot valve chamber 686 is trapped therein, and cannot escape, and because there is no other possible exhaust route for the main diaphragm chamber 628 during the period when the inlet chamber 598 is pressurized, the main valve core 642 will remain in its closed position for as long as the pressure within the inlet chamber 598 exceeds that within the outlet chamber 600. If it is desired to open the main valve core 642 in the presence of inlet pressure that exceeds the pressure within the outlet chamber 600, the blowdown valve 802 is utilized.

The blowdown valve 802 communicates the lower chamber 630 of the pilot valve 660 with the nozzle body 566. If the plunger 828 is depressed, the pressure within the chamber 630, and hence the annular chamber 686, will be drained through said blowdown valve 802 into the nozzle chamber 584. Once the pressure within the pilot valve chamber 686 has been relieved, the spring 728 will cause the pilot valve to open. After the pilot valve 660 has opened, pressure may again exhaust from the chamber 628 into the nozzle chamber 584. Because the exhaust passages 750, 754, 766 and 692 in the filling valve are larger than the orifice opening 742, pressure will drain from the main diaphragm chamber 628 at a rate faster than it can be replaced from the inlet chamber 598. Thus, the pressure within the main diaphragm chamber 628 will decrease substantially below that within the inlet chamber 598, and the main valve core 642 will open. Thereafter the filling valve will function in the manner as hereinabove described.

It is thus seen that a filling valve has been provided which fulfills each of the objects hereinabove set forth for the present invention. Obviously, the filling valve may be constructed in various sizes to accommodate various rates of flow.

Obviously, many modifications and variations of the present invention are possible in the light of the above teachings. It is, therefore, to be understood that within the scope of the appended claims, the invention may be practiced otherwise than as specifically described.

I claim:

1. A filling valve designed to be connected with the inlet opening of a tank, comprising: a housing, said housing including therein an inlet chamber and an outlet chamber; flow control means separating said inlet chamber from said outlet chamber, and movable between an open and a closed position, said flow control means being movable to its open position solely by fluid pressure in said inlet chamber; operating means connected to said flow control means, and operable by pressure from said inlet chamber to move said flow control means into its closed position against the fluid pressure in said inlet chamber; and control means, including a fluid pressure operated pilot valve, connected with said operating means, and operable by pressure fluid from said outlet chamber to render said operating means effective or ineffective to move said flow control means into its closed position depending upon the differential in said inlet and outlet chamber pressures.

2. A tank filling valve as recited in claim 1, wherein said operating means includes a diaphragm, one side of said diaphragm being in communication with said inlet chamber and the other side thereof being in communication with said outlet chamber.

3. A tank filling valve as recited in claim 2, wherein said control means is normally in communication with said one side of said diaphragm and said outlet chamber, and wherein said pilot valve is operable by pressure from said outlet chamber to seal said control means from said outlet chamber.

4. A tank filling valve as recited in claim 3, wherein said pilot valve includes: a flow control valve movable between an open and a closed position; resilient means arranged to urge said flow control valve toward an open position; and a differential diaphragm means connected to said flow control valve and arranged to close said flow control valve against the urging of said resilient means in response to a preselected pressure from said outlet chamber.

5. A tank filling valve as recited in claim 1, including additionally: means for maintaining fluid pressure within said inlet chamber.

6. A tank filling valve as recited in claim 5, wherein said pressure maintaining means comprises check valve means attached to said housing for selectively sealing said inlet chamber.

7. A filling valve designed to be connected with the inlet opening of a tank, comprising: a housing, said housing including therein an inlet chamber and an outlet chamber; a valve seat positioned between and communicating said inlet chamber with said outlet chamber; a main diaphragm supported within said housing, one side of said main diaphragm being in communication with said inlet chamber and the other side thereof being in communication with said outlet chamber; a main valve core operably connected to said diaphragm, and arranged to be moved into engagement with said valve seat in response to force exerted on said one side of said diaphragm by pressure from said inlet chamber, said flow control means being movable to its open position solely by fluid pressure in said inlet chamber; and control means for controlling the movement of said main diaphragm, including: means connectable with said outlet chamber for normally communicating said one side of said main diaphragm with said outlet chamber; and a fluid pressure operated pilot valve operable by pressure from said outlet chamber to close said communicating means, whereby when said communicating means is closed pressure from said inlet chamber can build up on said one side of said main diaphragm to move said core into engagement with said seat.

8. A tank filling valve as recited in claim 7, wherein said housing further includes a control chamber between said communicating means and said one side of said main diaphragm, and wherein said pilot valve includes: a valve seat separating said communicating means from said control chamber; a differential diaphragm mounted within said control chamber; a valve core operably connected to said differential diaphragm, and movable into and out of engagement with said pilot valve seat; and resilient means arranged to urge said valve core away from said valve seat.

9. A tank filling valve as recited in claim 8, including additionally: conduit means communicating said differential diaphragm with the exterior of said housing; and a blowdown valve mounted in said conduit means, said blowdown valve being operable to exhaust pressure from said differential diaphragm.

10. A tank filling valve as recited in claim 9, wherein said conduit means is connected to said outlet chamber downstream of said blowdown valve.

11. A tank filling valve as recited in claim 7, including additionally means connected to said housing for maintaining pressure within said inlet chamber when said main valve core is seated within said inlet chamber when said main valve core is seated.

12. A filling valve designed to be connected with the inlet opening of a tank, comprising: a housing, said housing including therein: an inlet chamber; an outlet chamber; a control chamber; and an outlet port communicating with said control chamber and arranged to be connected with said outlet chamber; a valve seat positioned between and communicating said inlet chamber and said outlet chamber; a main diaphragm supported within said housing, one side of said diaphragm being in communication with said inlet chamber and the other side thereof being in communication with said outlet chamber; a main valve core operably connected to said main diaphragm, and arranged to be moved into engagement with said valve seat in response to force exerted on said one side of said main diaphragm by pressure from said inlet chamber, said flow control means being movable to its open position solely by fluid pressure in said inlet chamber; means connecting said one side of said diaphragm with said control chamber; and normally open fluid pressure operated pilot valve means within said control chamber, and operable by pressure from said outlet chamber to close said outlet port, whereby when said outlet port is closed pressure from said inlet chamber can build up on said one side of said main diaphragm to move said main valve core into engagement with said seat against the fluid pressure in said inlet chamber.

13. A tank filling valve as recited in claim 12, wherein said pilot valve means includes: a valve seat disposed about said outlet port; a differential diaphragm supported within said control chamber; means communicating both sides of said differential diaphragm with said means connecting said one side of said main diaphragm with said control chamber; a pilot valve core supported by said differential diaphragm and movable into engagement with said outlet port valve seat; and resilient means arranged to urge said pilot valve core away from said valve seat, said resilient means having a force sufficient to hold said pilot valve core away from said valve seat until a preselected pressure is attained within said control chamber.

14. A tank filling valve as recited in claim 13, including additionally: a one-way check valve in said means connecting said one side of said main diaphragm with said control chamber, and arranged to restrict flow from said control chamber to said one side of said main diaphragm.

15. A tank filling valve as recited in claim 12, in combination with a tank wherein said tank filling valve is mounted on said tank so that said outlet port and said outlet chamber both open into said tank and are placed in communication thereby.

16. The combination as recited in claim 15, wherein the tank walls are constructed of flexible material and are collapsible, and wherein the filling valve includes additionally: means to prevent the collapsing walls of said flexible tank from closing said outlet port.

17. The combination as recited in claim 16, wherein said means to prevent closing of said outlet port includes: a groove-means-bearing portion on the exterior of said housing adjacent and in communication with said outlet port; and a cover receivable on said groove-means-bearing portion of said housing; said cover including passageway defining means therein arranged to cooperate with said groove means.

18. A tank filling valve as recited in claim 12, including additionally: conduit means connecting said outlet port with said outlet chamber; and flow control means within said conduit means.

19. A tank filling valve as recited in claim 18, including additionally: a Venturi nozzle connected to said outlet chamber, said conduit means connecting said outlet chamber with said outlet port being connected to the throat of said Venturi nozzle.

20. A tank filling valve as recited in claim 18, including additionally: a relief conduit means communicating said differential diaphragm with said outlet chamber; and blow-down valve means in said relief conduit.

21. In combination, a tank having an inlet opening; a normally closed check valve positioned relative to said inlet opening for retaining fluid in said tank; a filling nozzle connected with said tank including manually operable means for opening said check valve; a filling valve in communication with said filling nozzle and with said inlet opening, and through which fluid under pressure can flow into said tank, said filling valve including control means mounted thereon, said control means including a fluid pressure operated pilot valve and being responsive to a predetermined pressure of said fluid in said tank for effecting closing of said filling valve.

22. In combination, a tank having an inlet opening; an adapter ring connected with said tank in concentric relation to said inlet opening; a normally closed check valve mounted upon said adapter ring and extending into said inlet opening for retaining fluid in said tank; a filling nozzle detachably connectable with said adapter ring and including manually operable means for opening said check valve; a filling valve in communication with said filling nozzle and with said inlet opening, and through which fluid under pressure can flow into said tank, said filling valve including control means mounted thereon, said control means including a fluid pressure operated pilot valve and being responsive to a predetermined outlet pressure of said filling valve for effecting closing of said filling valve.

23. In combination, a tank having an inlet opening; a normally closed valve positioned at said inlet opening for retaining fluid in said tank; a filling nozzle connected with said tank, including manually operable means for opening said check valve; a filling valve in communication with said filling nozzle and with said inlet opening, and through which fluid under pressure can flow into said tank, said filling valve including: a housing having an inlet chamber, an outlet chamber, a control chamber, and an outlet port communicating said control chamber with the exterior of said housing; a valve seat positioned between said inlet and outlet chambers; a main diaphragm supported within said housing, and having one side thereof in communication with both said inlet chamber and said control chamber, and the other side thereof in communication with said outlet chamber; a valve core operably connected to said main diaphragm, and arranged to be moved into engagement with said valve seat in response to force exerted on said one side of said diaphragm by pressure from said inlet chamber; and control means for controlling the movement of said main diaphragm, including: means connecting said outlet port with said outlet chamber; and a fluid pressure operated pilot valve within said control chamber and operable by pressure from said outlet chamber to close said outlet port, whereby when said outlet port is closed pressure from said inlet chamber can build up on said one side of said main diaphragm to move said valve core into engagement with said seat.

24. The combination as recited in claim 23, wherein said filling valve is disposed within said tank on the outlet side of the check valve so that said outlet chamber and said outlet port open thereinto, and wherein said means connecting said outlet port with said outlet chamber comprises the walls of said tank.

25. The combination as recited in claim 24, wherein said normally closed check valve is mounted within the inlet chamber of said filling valve housing.

26. The combination as recited in claim 23, wherein said filling valve is mounted exteriorly of said tank, and wherein said means connecting said outlet port with said outlet chamber comprises conduit means.

References Cited by the Examiner
UNITED STATES PATENTS

| | | | |
|---|---|---|---|
| 1,051,850 | 1/1913 | Sandmark | 128—344 |
| 2,548,368 | 4/1951 | Hartley et al. | 141—217 |
| 2,574,022 | 11/1951 | Dahl | 141—217 |
| 2,753,884 | 7/1956 | Lindsay | 137—614.2 X |
| 2,974,678 | 3/1961 | Russell | 137—489 |
| 3,011,516 | 12/1961 | Werter | 137—489 |
| 3,055,405 | 9/1962 | Pase | 141—207 |

FOREIGN PATENTS 875,315   6/1942   France.

LAVERNE D. GEIGER, *Primary Examiner.*

H. BELL, *Assistant Examiner.*